US011035479B2

(12) United States Patent
Masias et al.

(10) Patent No.: US 11,035,479 B2
(45) Date of Patent: Jun. 15, 2021

(54) CIRCUMFERENTIALLY-SECTIONED VALVE CAGES

(71) Applicant: Emerson Process Management Regulator Technologies, Inc.., McKinney, TX (US)

(72) Inventors: Justin L. Masias, McKinney, TX (US); David O. Plummer, Irving, TX (US); Guolei Fan, Chengdu (CN); Yawei Xiao, Chengdu (CN)

(73) Assignee: EMERSON PROCESS MANAGEMENT REGULATOR TECHNOLOGIES, INC, McKinney, TX (US)

( * ) Notice: Subject to any disclaimer, the term of this patent is extended or adjusted under 35 U.S.C. 154(b) by 21 days.

(21) Appl. No.: 16/660,383

(22) Filed: Oct. 22, 2019

(65) Prior Publication Data

US 2021/0116037 A1    Apr. 22, 2021

(30) Foreign Application Priority Data

Oct. 16, 2019   (CN) .......................... 201910983650.5
Oct. 16, 2019   (CN) .......................... 201921735082.9

(51) Int. Cl.
*F16K 3/30*     (2006.01)
*F16K 27/04*    (2006.01)
*F16K 3/26*     (2006.01)

(52) U.S. Cl.
CPC .............. *F16K 3/30* (2013.01); *F16K 27/041* (2013.01); *F16K 3/262* (2013.01)

(58) Field of Classification Search
CPC ........... F16K 3/30; F16K 27/041; F16K 47/08

USPC ........................................................ 251/328
See application file for complete search history.

(56) References Cited

U.S. PATENT DOCUMENTS

| 4,356,843 | A  |   | 11/1982 | Baumann |                      |
|-----------|----|---|---------|---------|----------------------|
| 5,012,841 | A  | * | 5/1991  | Kueffer | F16K 47/04 137/625.39 |
| 5,113,908 | A  | * | 5/1992  | Steinke | F16K 47/04 137/625.3 |
| 5,337,787 | A  | * | 8/1994  | Fiondella | F16K 27/041 137/625.66 |
| 5,732,728 | A  | * | 3/1998  | Maichel | F16L 55/105 137/15.14 |
| 6,026,859 | A  | * | 2/2000  | Wears   | F16K 47/08 137/625.33 |
| 6,244,297 | B1 | * | 6/2001  | Baumann | F16K 47/08 137/625.3 |

(Continued)

OTHER PUBLICATIONS

International Searching Authority, "International Search Report and Written Opinion," issued in connection with International Patent Application No. PCT/US2020/053506, dated Dec. 22, 2020, 12 pages.

*Primary Examiner* — Kevin R Barss
(74) *Attorney, Agent, or Firm* — Hanley, Flight & Zimmerman, LLC

(57) ABSTRACT

Circumferentially-sectioned valve cages are disclosed. An example apparatus comprises a plurality of cage sections collectively configured to be removably coupled together to form a valve cage having a circumference and a plurality of joints. The joints correspond in number to the cage sections and are spaced apart from one another about the circumference. Respective ones of the joints are defined by neighboring ones of the cage sections.

20 Claims, 17 Drawing Sheets

SECTION A-A

(56) References Cited

U.S. PATENT DOCUMENTS

| | | | | |
|---|---|---|---|---|
| 6,382,253 | B1* | 5/2002 | McCarty | F16K 47/08 |
| | | | | 137/625.33 |
| 7,854,239 | B2* | 12/2010 | Wears | F16K 11/044 |
| | | | | 137/625.4 |
| 8,910,661 | B2* | 12/2014 | Griffin, Jr. | F16K 3/0209 |
| | | | | 137/625.3 |
| 9,222,624 | B2* | 12/2015 | McCarty | F16K 47/08 |
| 2004/0031527 | A1* | 2/2004 | Stratton | F16K 1/42 |
| | | | | 137/625.37 |
| 2005/0211321 | A1* | 9/2005 | Bush | F16K 47/10 |
| | | | | 138/42 |
| 2006/0130911 | A1* | 6/2006 | Caprera | F16K 47/04 |
| | | | | 137/614.11 |
| 2009/0179163 | A1* | 7/2009 | Fleming | F16K 47/08 |
| | | | | 251/122 |
| 2010/0300565 | A1* | 12/2010 | Samy | F16K 47/08 |
| | | | | 137/601.01 |
| 2014/0183384 | A1 | 7/2014 | Griffin et al. | |
| 2015/0152976 | A1* | 6/2015 | Fagerlund | F16K 47/08 |
| | | | | 251/127 |
| 2018/0112799 | A1* | 4/2018 | Eilers | F16K 47/08 |
| 2020/0325996 | A1* | 10/2020 | Hostetter | F16K 1/52 |

* cited by examiner

SECTION A-A

FIG. 7 SECTION B-B

SECTION C-C

SECTION D-D

US 11,035,479 B2

CIRCUMFERENTIALLY-SECTIONED VALVE CAGES

RELATED APPLICATIONS

This patent claims priority to Chinese Patent Application No. 201910983650.5 and Chinese Patent Application No. 201921735082.9, both filed Oct. 16, 2019, and both entitled "Circumferentially-Sectioned Valve Cages." The entireties of Chinese Patent Application No. 201910983650.5 and Chinese Patent Application No. 201921735082.9 are hereby incorporated herein by reference.

FIELD OF THE DISCLOSURE

This disclosure relates generally to valve cages and, more particularly, to circumferentially-sectioned valve cages.

BACKGROUND

Valves commonly include a valve body defining a fluid pathway having an inlet and outlet. A plug located within the valve body is movable relative to a seat ring located within the valve body to control the flow of a fluid through the valve body and/or along the fluid pathway. In some known valves, the flow of the fluid through the valve body and/or along the fluid pathway is further controlled and/or impacted via a cage located within the valve body. The cage typically has a cylindrical, single-piece (e.g., joint-free) shape and/or configuration, with the cage being arranged within the valve body such that a sidewall of the cage circumscribes the plug. The sidewall of the cage includes a plurality of fluid passages and/or openings (e.g., through-holes) arranged in a spaced relationship about the sidewall and/or around the circumference of the cage.

Fluid flowing through the valve body and/or along the fluid pathway of the valve passes from the inlet of the valve body, through the seat ring, through one or more of the openings of the sidewall of the cage, and toward the outlet of the valve body. The arrangement and/or orientation of the openings about the sidewall and/or around the circumference of the cage impacts the flow characteristics of the fluid passing through the valve body and/or along the fluid pathway, including the rate at which the fluid passes through the valve body and/or along the fluid pathway.

SUMMARY

Example circumferentially-sectioned valve cages are disclosed. In some examples, an apparatus is disclosed. In some disclosed examples, the apparatus comprises a plurality of cage sections collectively configured to be removably coupled together to form a valve cage having a circumference and a plurality of joints. In some disclosed examples, the joints correspond in number to the cage sections and are spaced apart from one another about the circumference. In some disclosed examples, respective ones of the joints are defined by neighboring ones of the cage sections.

In some examples, a valve cage is disclosed. In some disclosed examples, the valve cage comprises a plurality of cage sections removably coupled together to form a circumference of the valve cage. In some disclosed examples, the valve cage comprises a plurality of joints. In some disclosed examples, the joints correspond in number to the cage sections and are spaced apart from one another about the circumference. In some disclosed examples, respective ones of the joints are defined by neighboring ones of the cage sections.

In some examples, a valve is disclosed. In some disclosed examples, the valve comprises a valve body and a valve cage located within the valve body. In some disclosed examples, the valve cage includes a plurality of cage sections removably coupled together to form a circumference of the valve cage. In some disclosed examples, the valve cage further includes a plurality of joints. In some disclosed examples, the joints correspond in number to the cage sections and are spaced apart from one another about the circumference. In some disclosed examples, respective ones of the joints are defined by neighboring ones of the cage sections.

Figure 1:
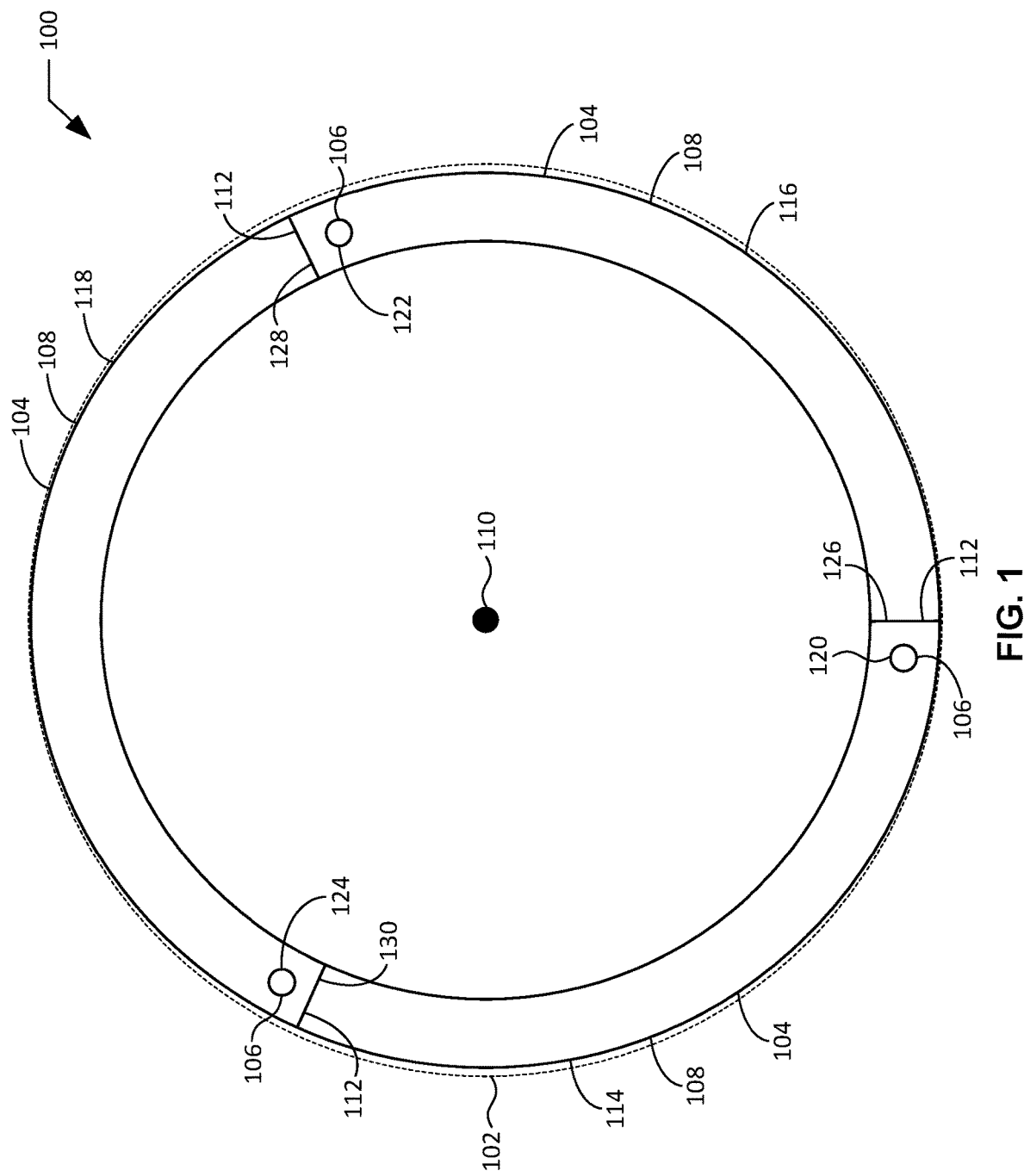
FIG. 1 is a plan view of a first example valve cage.

Certain examples are shown in the above-identified figures and described in detail below. In describing these examples, identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

As used herein in reference to a component (e.g., a valve cage, etc.), the term "single-piece" refers to a unitary, one-piece component that is free of joints held together via welding or other mechanical coupling, joining and/or fastening components. As used herein in reference to a first component (e.g., a first cage section of a valve cage) coupled to a second component (e.g., a second cage section of the valve cage), the term "removably coupled" means the first component is coupled, joined, connected and/or fastened to the second component via one or more coupling, joining, connecting and/or fastening component(s) in a non-permanent manner that enables the first component to subsequently be uncoupled, enjoined, unconnected and/or unfastened from the second component without damaging and/or destroying the coupling, joining, connecting and/or fastening component(s). As used herein, the term "additive manufacturing" refers generally to a process by which three-dimensional design data (e.g., a computer-aided design (CAD) file) is used in conjunction with a controllable laser to fabricate an object by depositing successive layers of material on top of one another. For example, rather than milling and/or machining an object from a solid block of material, additive manufacturing fabricates the object layer by layer using one or more material(s) in the form of a fine powder (e.g., a metallic powder, a plastic powder, a composite powder, etc.) capable of being solidified by application of the laser thereto.

Known valve cages typically have a cylindrical, single-piece (e.g., joint-free) shape that is sized and/or configured to facilitate centrally locating a cylindrical valve plug within the valve cage, such that a sidewall of the valve cage circumscribes the valve plug. The sidewall of the valve cage includes a plurality of fluid passages and/or openings (e.g., through-holes) arranged in a spaced relationship about the sidewall and/or around the circumference of the cage.

The known single-piece valve cages described above have traditionally been fabricated using a variety of casting, molding, milling, forging and/or drilling processes and/or techniques. More recently, consideration has been given to fabricating single-piece valve cages via additive manufacturing processes and/or techniques that have commercially evolved. Regardless of the chosen process, challenges and/or constraints often arise when the single-piece valve cage for which fabrication is desired has a relatively large size (e.g., a diameter exceeding eighteen inches). For example, conventional tooling and/or molds become more complex and/or more costly as the desired size of the single-piece valve cage increases. As another example, most commercially available 3D-printer systems that facilitate additive manufacturing have build envelopes and/or build platforms that prevent and/or prohibit the ability to fabricate a relatively large single-piece valve cage.

Unlike the known single-piece valve cages described above, example valve cages disclosed herein are circumferentially sectioned. More specifically, example valve cages disclosed herein include a plurality of cage sections that are removably couplable to one another to form a circumference of the valve cage. When assembled (e.g., when the cage sections are removably coupled to one another), the example circumferentially-sectioned valve cages disclosed herein include joints corresponding in number to the cage sections, with the joints being spaced apart from one another about the circumference of the valve cage, and respective ones of the joints being defined by neighboring ones of the cage sections. In some examples, the example circumferentially-sectioned valve cages disclosed herein have a diameter exceeding eighteen inches. By fabricating the example circumferentially-sectioned valve cages disclosed herein as a plurality of removably couplable cage sections, as opposed to a single-piece valve cage, the above-described challenges and/or constraints that often arise when fabricating a single-piece valve cage having a relatively large size are advantageously eliminated.

Figure 2:
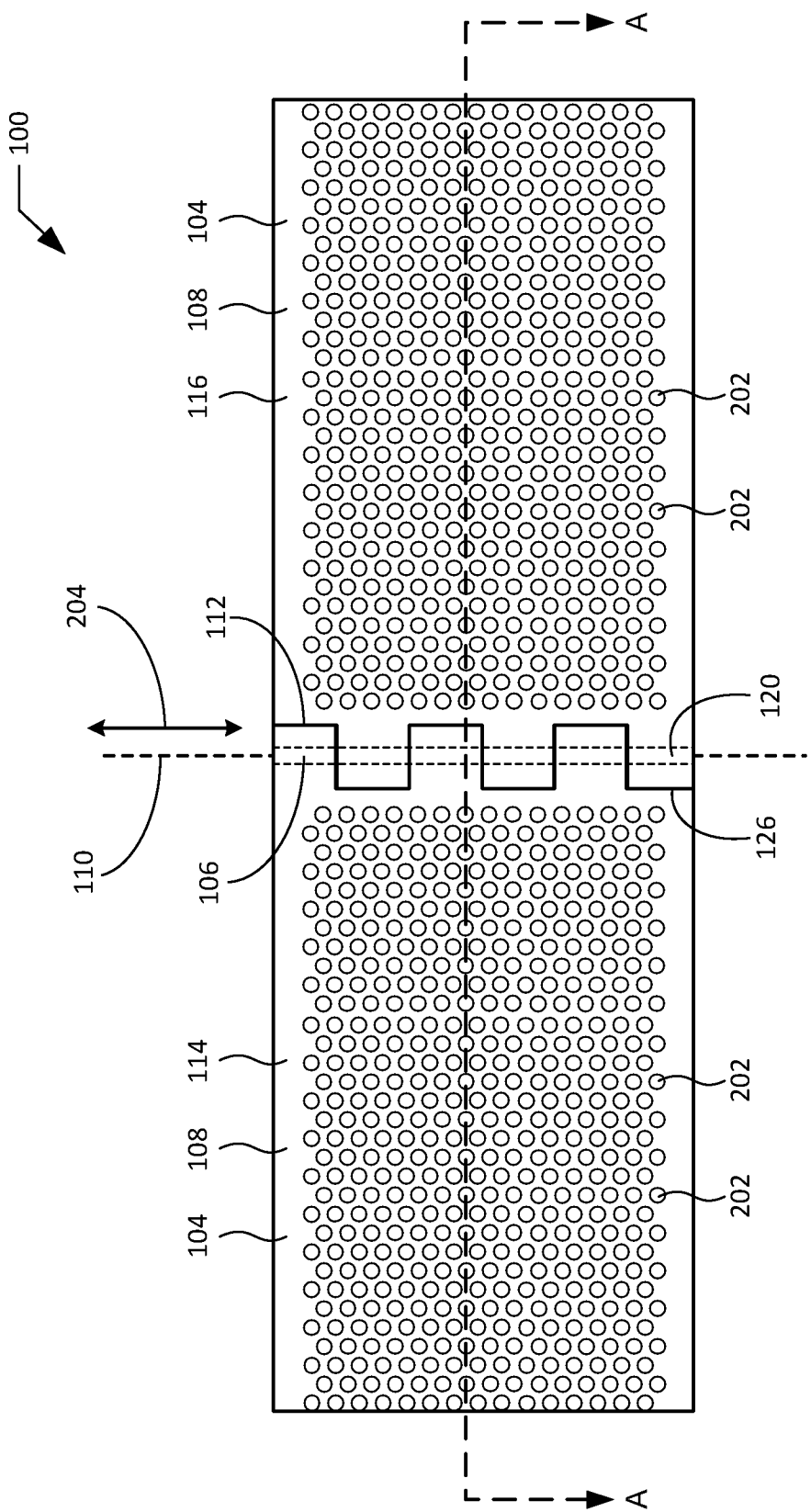
FIG. 2 is a side view of the valve cage of FIG. 1.
Figure 3:
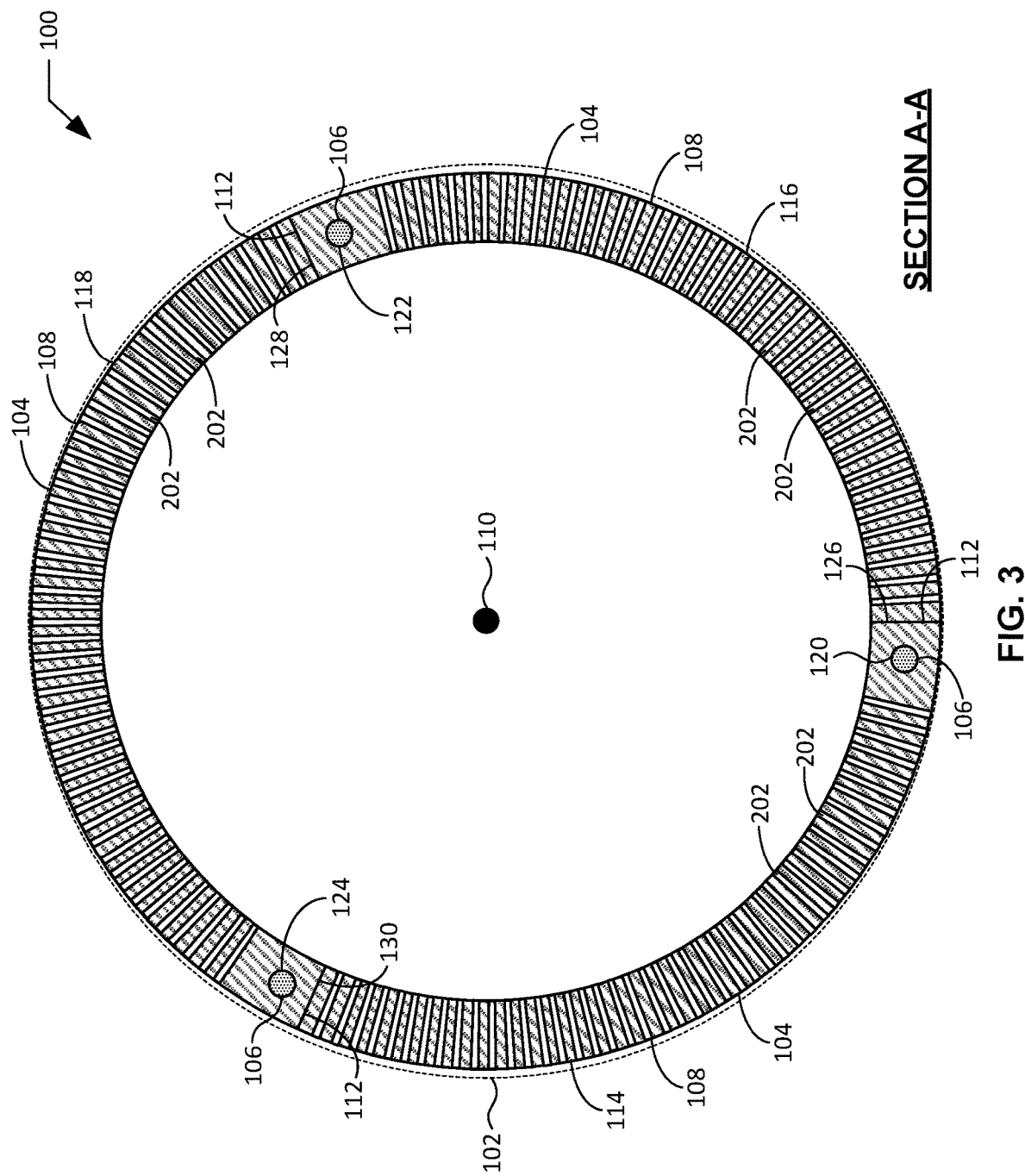
FIG. 3 is a cross-sectional view of the valve cage of FIGS. 1 and 2 taken along section A-A of FIG. 2.

FIG. 1 is a plan view of a first example valve cage 100. FIG. 2 is a side view of the valve cage 100 of FIG. 1. FIG. 3 is a cross-sectional view of the valve cage 100 of FIGS. 1 and 2 taken along section A-A of FIG. 2. The valve cage 100 of FIGS. 1-3 is a circumferentially-sectioned valve cage having an example circumference 102 formed by a plurality of example cage sections 104 that are removably coupled to one another via example pins 106, as further described below. In some examples, the diameter of the valve cage 100 of FIGS. 1-3 may exceed eighteen inches.

Each cage section 104 of the valve cage 100 of FIGS. 1-3 is fabricated using an additive manufacturing process, with each resultant cage section 104 being integrally formed as a single-piece structure having the features described herein. In some examples, respective ones of the cage sections 104 of the valve cage 100 of FIGS. 1-3 are fabricated within a common build envelope and/or on a common build platform of a 3D-printer system during a single build performed using an additive manufacturing process. In some such examples, each of the cage sections 104 is fabricated such that first ends of the cage sections 104 are aligned with one another within the build envelope and/or on the build platform, second ends of the cage sections 104 are aligned with one another within the build envelope and/or on the build platform, and curvatures of the cage sections 104 extending between the first and second ends of the cage sections 104 are commonly oriented within the build envelope and/or on the build platform. In other examples, one or more of the cage sections 104 of the valve cage 100 of FIGS. 1-3 may alternatively be fabricated using one or more casting, molding, milling, forging and/or drilling processes, with each resultant cage section 104 being integrally formed as a single-piece structure having the features described herein.

As shown in FIGS. 2 and 3, each cage section 104 includes a plurality of example openings 202 (e.g., through-holes) formed in and/or extending through an example sidewall 108 of the cage section 104. The openings 202 of each sidewall 108 are configured to enable fluid to pass through the sidewall 108 (e.g., from an outer surface of the sidewall 108 to an inner surface of the sidewall 108). The openings 202 can be formed and/or configured as passages of any size, shape, geometry and/or pattern that enable fluid to pass through the sidewall 108. In the illustrated example of FIGS. 1-3, the sidewalls 108 and/or, more generally, the cage sections 104 of the valve cage 100 define a cylindrical shape having an example central axis 110 and a circular cross-section perpendicular to the central axis 110. In other examples, the sidewalls 108 and/or, more generally, the cage sections 104 of the valve cage 100 may alternatively define a cylindrical shape having an oval or elliptical cross-section perpendicular to the central axis 110.

The valve cage 100 of FIGS. 1-3 further includes a plurality of example joints 112. The joints 112 correspond in number to the cage sections 104, and are spaced apart from one another about the circumference 102 of the valve cage 100 at locations defined by neighboring ones of the cage sections 104. As shown in FIG. 2, the joints 112 of the valve cage 100 extend along an example axial direction 204 defined by and/or parallel to the central axis 110 of the valve cage 100. In other examples, the joints 112 of the valve cage 100 may alternatively extend in a direction that lies at a non-parallel angle relative to the central axis 110 of the valve cage 100.

In the illustrated example of FIGS. 1-3, the cage sections 104 of the valve cage 100 include a first example cage section 114, a second example cage section 116, and a third example cage section 118. The pins 106 of the valve cage 100 include a first example pin 120, a second example pin 122, and a third example pin 124. The joints 112 of the valve cage 100 include a first example joint 126, a second example joint 128, and a third example joint 130. The first cage section 114 is removably coupled to the second cage section 116 at the first joint 126 via the first pin 120, and is further removably coupled to the third cage section 118 at the third joint 130 via the third pin 124. The second cage section 116 is removably coupled to the third cage section 118 at the second joint 128 via the second pin 122, and is further removably coupled to the first cage section 114 at the first joint 126 via the first pin 120. The third cage section 118 is removably coupled to the first cage section 114 at the third joint 130 via the third pin 124, and is further removably coupled to the second cage section 116 at the second joint 128 via the second pin 122.

Each of the first, second and third cage sections 114, 116, 118 of the valve cage 100 of FIGS. 1-3 has an arc length (e.g., measured along an outer surface of the sidewall 108) equal to approximately one-third of the circumference 102 of the valve cage 100. In the illustrated example of FIGS. 1-3, the first, second and third cage sections 114, 116, 118 of the valve cage 100 are uniformly distributed (e.g., equally spaced) about the circumference 102 of the valve cage 100 relative to the central axis 110 of the valve cage 100. The first, second and third joints 126, 128, 130 of the valve cage 100 are also uniformly distributed (e.g., equally spaced) about the circumference 102 of the valve cage 100 relative to the central axis 110 of the valve cage 100. Thus, in the illustrated example of FIGS. 1-3, the valve cage 100 includes three (3) uniformly-distributed cage sections 104 and three uniformly-distributed (3) joints 112, with each of the three (3) cage sections 104 having an arc length equal to approximately one-third of the circumference 102 of the valve cage 100.

In other examples, the valve cage 100 of FIGS. 1-3 may include a different number of cage sections 104 and a different corresponding number of joints 112 relative to the number of cage sections 104 and joints 112 shown in FIGS. 1-3. For example, the valve cage 100 of FIGS. 1-3 can alternatively be configured to include only two (2) uniformly-distributed cage sections 104 and only two (2) uniformly-distributed joints 112, with each of the two (2) cage sections 104 having an arc length equal to approximately one-half of the circumference 102 of the valve cage 100. As another example, the valve cage 100 of FIGS. 1-3 can alternatively be configured to include four (4) uniformly-distributed cage sections 104 and four (4) uniformly-distributed joints 112, with each of the four (4) cage sections 104 having an arc length equal to approximately one-fourth of the circumference 102 of the valve cage 100.

In still other examples, the valve cage 100 may include cage sections 104 that are not uniformly distributed, and/or that have differing arc lengths. For example, the valve cage 100 of FIGS. 1-3 can alternatively be configured to include two (2) non-uniformly-distributed cage sections 104 and two (2) non-uniformly-distributed joints 112, with a first one of the two (2) cage sections 104 having an arc length equal to approximately one-third of the circumference 102 of the valve cage 100, and a second one of the two (2) cage sections 104 having an arc length equal to approximately two-thirds of the circumference 102 of the valve cage 100. As another example, the valve cage 100 of FIGS. 1-3 can alternatively be configured to include three (3) non-uniformly-distributed cage sections 104 and three (3) non-uniformly-distributed joints 112, with a first one of the three (3) cage sections 104 having an arc length equal to approximately one-fourth of the circumference 102 of the valve cage 100, a second one of the three (3) cage sections 104 having an arc length equal to approximately one-fourth of the circumference 102 of the valve cage 100, and a third one of the three (3) cage sections 104 having an arc length equal to approximately one-half of the circumference 102 of the valve cage 100.

Figure 4:
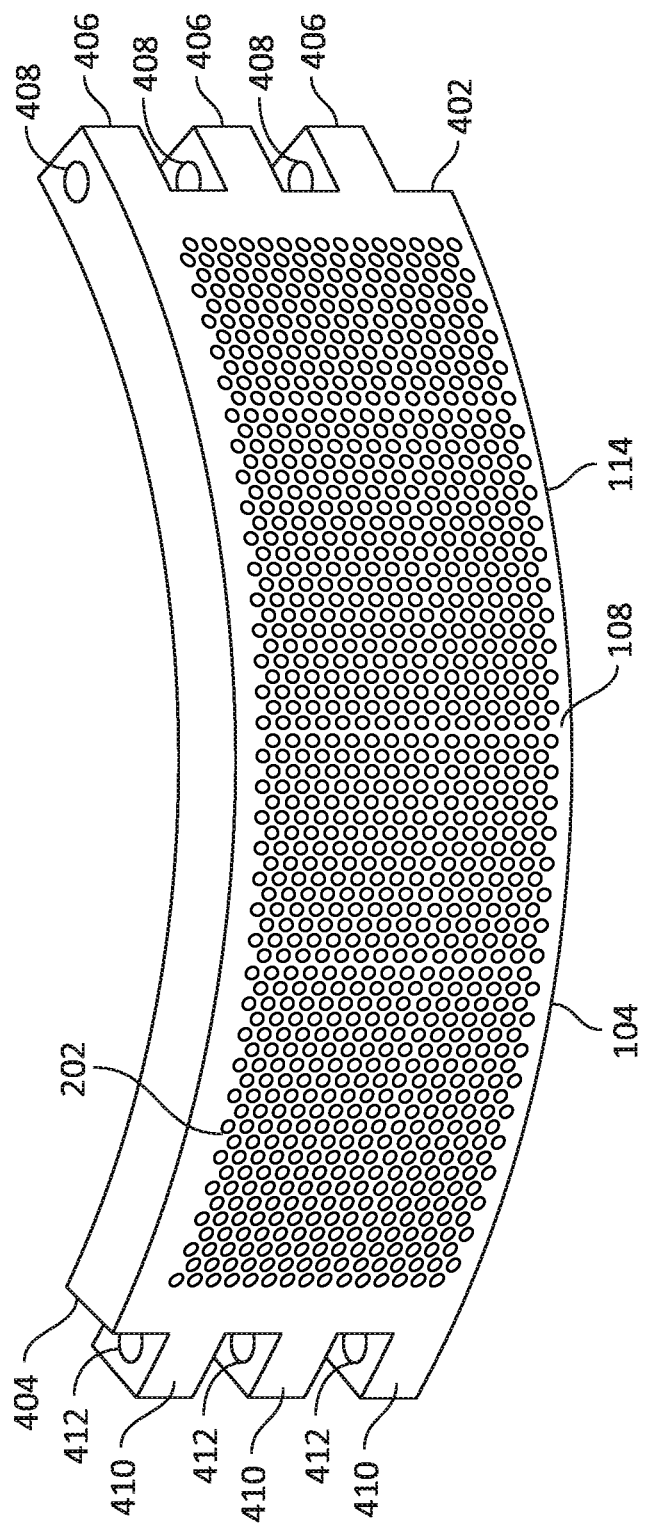
FIG. 4 is an isolated perspective view of one of the cage sections of the valve cage of FIGS. 1-3.

FIG. 4 is an isolated perspective view of the first cage section 114 of the valve cage 100 of FIGS. 1-3. The second cage section 116 and the third cage section 118 of the valve cage 100 of FIGS. 1-3 are structured and/or configured in a manner that is substantially identical to that of the first cage section 114 shown and described in connection with FIG. 4. As shown in FIG. 4, the first cage section 114 includes a first example end 402 and a second example end 404 located opposite the first end 402. First example arms 406 are formed and/or located at the first end 402 of the first cage section 114 such that the first arms 406 extend circumferentially away from the first end 402 of the first cage section 114. Respective ones of the first arms 406 are axially spaced apart from one another (e.g., along the axial direction 204 of FIG. 2). Each of the first arms 406 includes a first example axially-oriented opening 408 (e.g., a bore or through-hole extending along the axial direction 204 of FIG. 2). Respective ones of the first arms 406 are axially aligned with one another (e.g., along the axial direction 204 of FIG. 2), as are respective ones of the first axially-oriented openings 408.

As further shown in FIG. 4, second example arms 410 are formed and/or located at the second end 404 of the first cage section 114 such that the second arms 410 extend circumferentially away from the second end 404 of the first cage section 114. Respective ones of the second arms 410 are axially spaced apart from one another (e.g., along the axial direction 204 of FIG. 2). Each of the second arms 410 includes a second example axially-oriented opening 412 (e.g., a bore or through-hole extending along the axial direction 204 of FIG. 2). Respective ones of the second arms 410 are axially aligned with one another (e.g., along the axial direction 204 of FIG. 2), as are respective ones of the second axially-oriented openings 412.

The first cage section 114 of the valve cage 100 is structured and/or configured such that the respective axial locations of the second arms 410 of the first cage section 114 are staggered and/or offset relative to the respective axial locations of the first arms 406 of the first cage section 114. The second cage section 116 and the third cage section 118 are structured and/or configured in a substantially identical manner, thereby enabling the first arms 406 of the first cage section 114 shown in FIG. 4 to be interleaved with the second arms 410 of the second cage section 116 of the valve cage 100, further enabling the second arms 410 of the first cage section 114 shown in FIG. 4 to be interleaved with the first arms 406 of the third cage section 118 of the valve cage 100, and still further enabling the first arms 406 of the second cage section 116 of the valve cage 100 to be interleaved with the second arms 410 of the third cage section 118.

When the first arms 406 of the first cage section 114 shown in FIG. 4 are interleaved with the second arms 410 of the second cage section 116 of the valve cage 100 (e.g., as shown in FIGS. 1-3), the first axially-oriented openings 408 of the first arms 406 of the first cage section 114 are axially aligned with the second axially-oriented openings 412 of the second arms 410 of the second cage section 116. Axial alignment between the first axially-oriented openings 408 of the first arms 406 of the first cage section 114 and the second axially-oriented openings 412 of the second arms 410 of the second cage section 116 enables the first pin 120 to be disposed through and/or within respective ones of the aligned axially-oriented openings. When so disposed, the first pin 120 removably couples the first cage section 114 to the second cage section 116.

When the first arms 406 of the second cage section 116 of the valve cage 100 are interleaved with the second arms 410 of the third cage section 118 of the valve cage 100, the first axially-oriented openings 408 of the first arms 406 of the second cage section 116 are axially aligned with the second axially-oriented openings 412 of the second arms 410 of the third cage section 118. Axial alignment between the first axially-oriented openings 408 of the first arms 406 of the second cage section 116 and the second axially-oriented openings 412 of the second arms 410 of the third cage section 118 enables the second pin 122 to be disposed through and/or within respective ones of the aligned axially-oriented openings. When so disposed, the second pin 122 removably couples the second cage section 116 to the third cage section 118.

When the first arms 406 of the third cage section 118 of the valve cage 100 are interleaved with the second arms 410 of the first cage section 114 of the valve cage 100, the first axially-oriented openings 408 of the first arms 406 of the third cage section 118 are axially aligned with the second axially-oriented openings 412 of the second arms 410 of the first cage section 114. Axial alignment between the first axially-oriented openings 408 of the first arms 406 of the third cage section 118 and the second axially-oriented openings 412 of the second arms 410 of the first cage section 114 enables the third pin 124 to be disposed through and/or within respective ones of the aligned axially-oriented openings. When so disposed, the third pin 124 removably couples the third cage section 118 to the first cage section 114.

Figure 5:
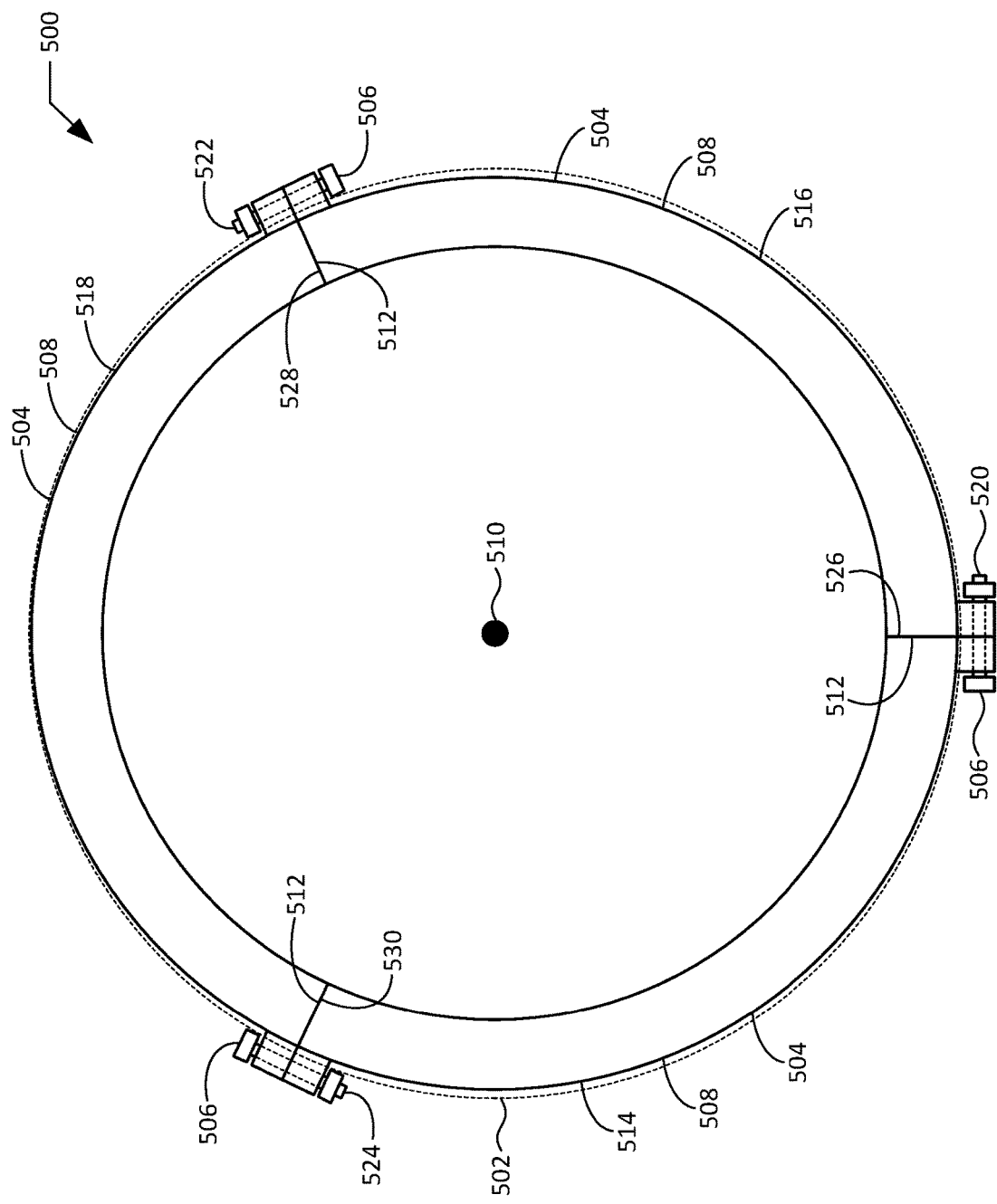
FIG. 5 is a plan view of a second example valve cage.
Figure 6:
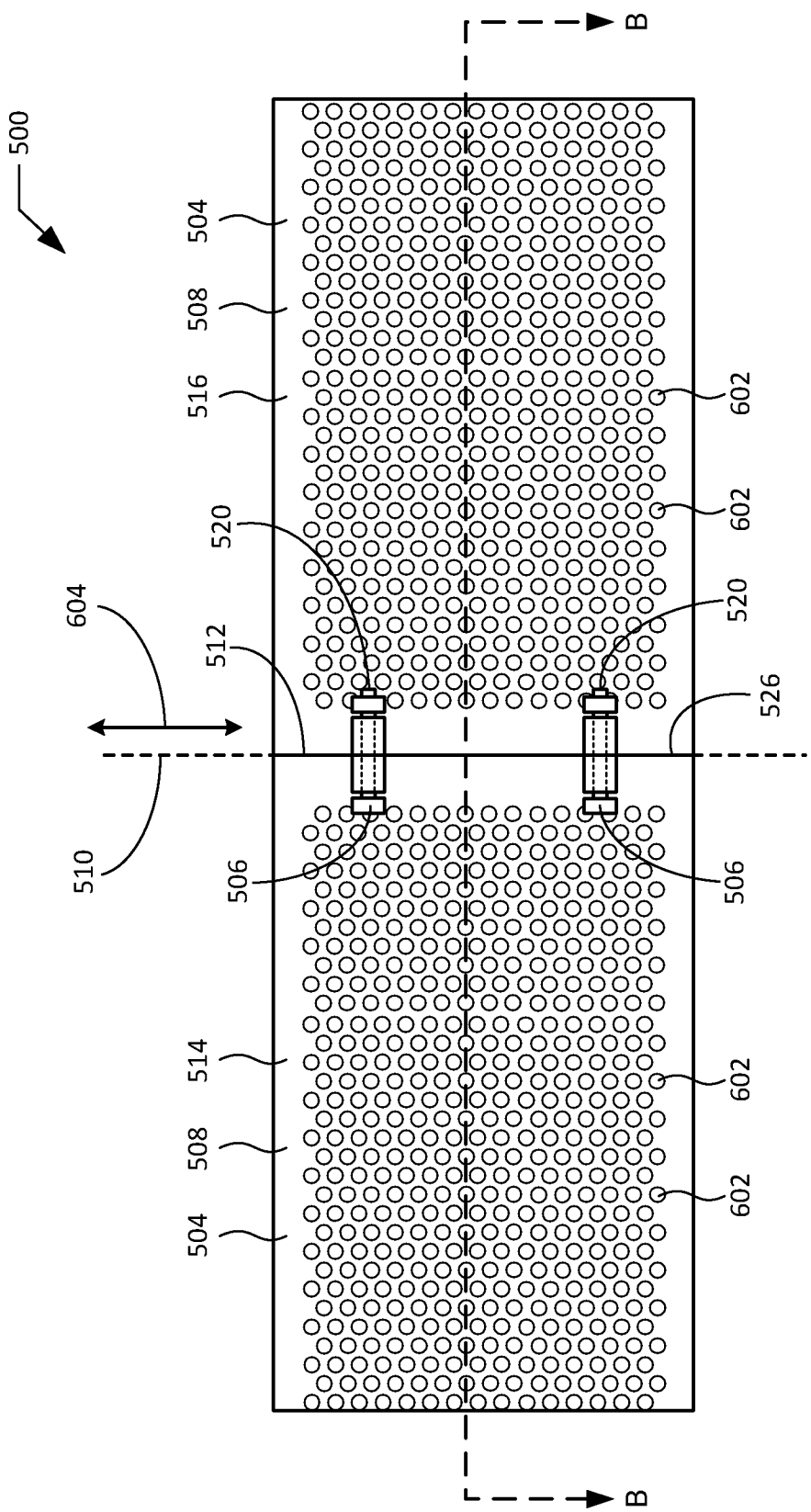
FIG. 6 is a side view of the valve cage of FIG. 5.
Figure 7:
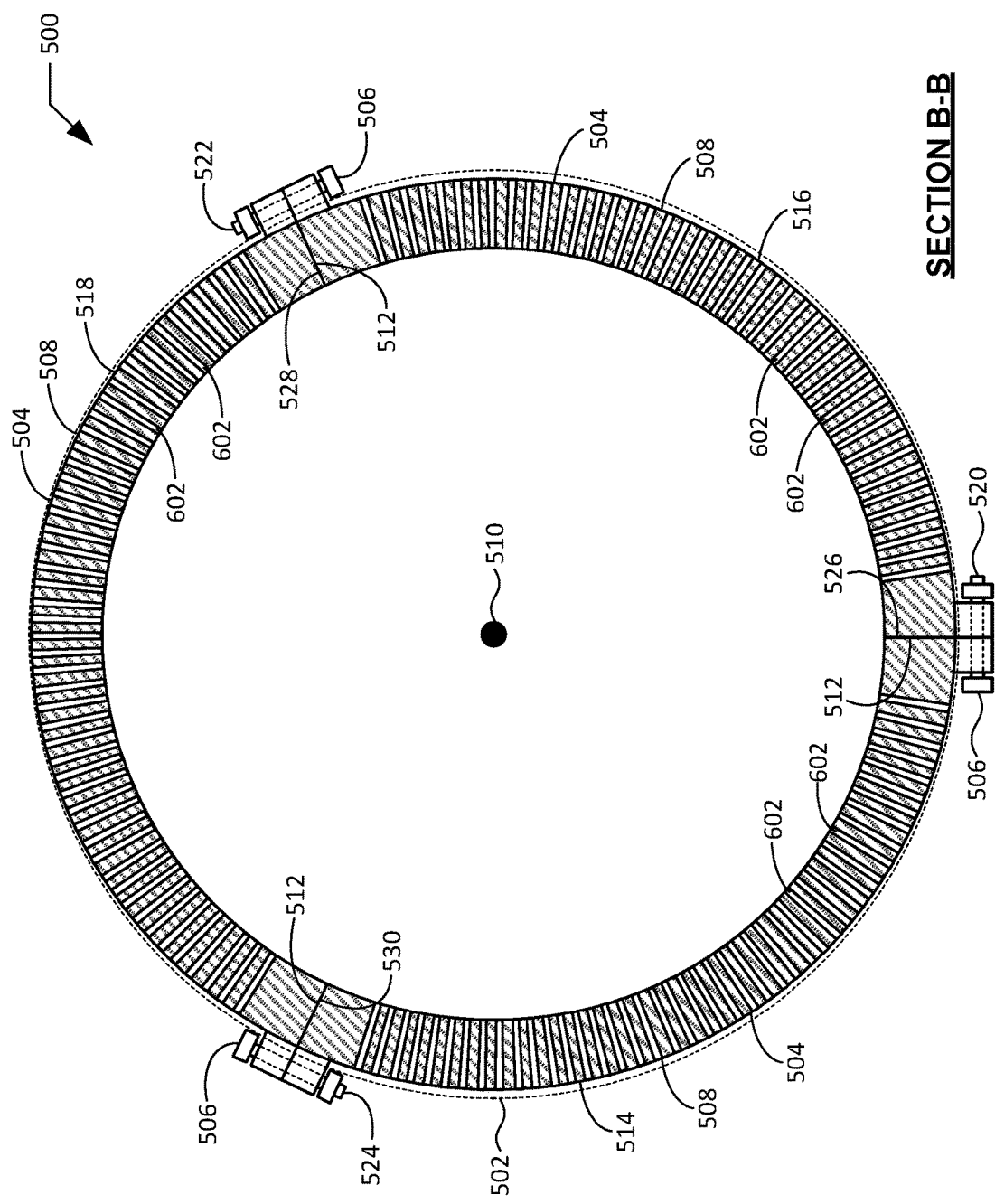
FIG. 7 is a cross-sectional view of the valve cage of FIGS. 5 and 6 taken along section B-B of FIG. 6.

FIG. 5 is a plan view of a second example valve cage 500. FIG. 6 is a side view of the valve cage 500 of FIG. 5. FIG. 7 is a cross-sectional view of the valve cage 500 of FIGS. 5 and 6 taken along section B-B of FIG. 6. The valve cage 500 of FIGS. 5-7 is a circumferentially-sectioned valve cage having an example circumference 502 formed by a plurality of example cage sections 504 that are removably coupled to one another via example bolts 506, as further described below. In some examples, the diameter of the valve cage 500 of FIGS. 5-7 may exceed eighteen inches.

Each cage section 504 of the valve cage 500 of FIGS. 5-7 is fabricated using an additive manufacturing process, with each resultant cage section 504 being integrally formed as a single-piece structure having the features described herein. In some examples, respective ones of the cage sections 504 of the valve cage 500 of FIGS. 5-7 are fabricated within a common build envelope and/or on a common build platform of a 3D-printer system during a single build performed using an additive manufacturing process. In some such examples, each of the cage sections 504 is fabricated such that first ends of the cage sections 504 are aligned with one another within the build envelope and/or on the build platform, second ends of the cage sections 504 are aligned with one another within the build envelope and/or on the build platform, and curvatures of the cage sections 504 extending between the first and second ends of the cage sections 504 are commonly oriented within the build envelope and/or on the build platform. In other examples, one or more of the cage sections 504 of the valve cage 500 of FIGS. 5-7 may alternatively be fabricated using one or more casting, molding, milling, forging and/or drilling processes, with each resultant cage section 504 being integrally formed as a single-piece structure having the features described herein.

As shown in FIGS. 6 and 7, each cage section 504 includes a plurality of example openings 602 (e.g., through-holes) formed in and/or extending through an example sidewall 508 of the cage section 504. The openings 602 of each sidewall 508 are configured to enable fluid to pass through the sidewall 508 (e.g., from an outer surface of the sidewall 508 to an inner surface of the sidewall 508). The openings 602 can be formed and/or configured as passages of any size, shape, geometry and/or pattern that enable fluid to pass through the sidewall 508. In the illustrated example of FIGS. 5-7, the sidewalls 508 and/or, more generally, the cage sections 504 of the valve cage 500 define a cylindrical shape having an example central axis 510 and a circular cross-section perpendicular to the central axis 510. In other examples, the sidewalls 508 and/or, more generally, the cage sections 504 of the valve cage 500 may alternatively define a cylindrical shape having an oval or elliptical cross-section perpendicular to the central axis 510.

The valve cage 500 of FIGS. 5-7 further includes a plurality of example joints 512. The joints 512 correspond in number to the cage sections 504, and are spaced apart from one another about the circumference 502 of the valve cage 500 at locations defined by neighboring ones of the cage sections 504. As shown in FIG. 6, the joints 512 of the valve cage 500 extend along an example axial direction 604 defined by and/or parallel to the central axis 510 of the valve cage 500. In other examples, the joints 512 of the valve cage 500 may alternatively extend in a direction that lies at a non-parallel angle relative to the central axis 510 of the valve cage 500.

In the illustrated example of FIGS. 5-7, the cage sections 504 of the valve cage 500 include a first example cage section 514, a second example cage section 516, and a third example cage section 518. The bolts 506 of the valve cage 500 include first example bolts 520, second example bolts 522, and third example bolts 524. The joints 512 of the valve cage 500 include a first example joint 526, a second example joint 528, and a third example joint 530. The first cage section 514 is removably coupled to the second cage section 516 at the first joint 526 via the first bolts 520, and is further removably coupled to the third cage section 518 at the third joint 530 via the third bolts 524. The second cage section 516 is removably coupled to the third cage section 518 at the second joint 528 via the second bolts 522, and is further removably coupled to the first cage section 514 at the first joint 526 via the first bolts 520. The third cage section 518 is removably coupled to the first cage section 514 at the third joint 530 via the third bolts 524, and is further removably coupled to the second cage section 516 at the second joint 528 via the second bolts 522.

Each of the first, second and third cage sections 514, 516, 518 of the valve cage 500 of FIGS. 5-7 has an arc length (e.g., measured along an outer surface of the sidewall 508) equal to approximately one-third of the circumference 502 of the valve cage 500. In the illustrated example of FIGS. 5-7, the first, second and third cage sections 514, 516, 518 of the valve cage 500 are uniformly distributed (e.g., equally spaced) about the circumference 502 of the valve cage 500 relative to the central axis 510 of the valve cage 500. The first, second and third joints 526, 528, 530 of the valve cage 500 are also uniformly distributed (e.g., equally spaced) about the circumference 502 of the valve cage 500 relative to the central axis 510 of the valve cage 500. Thus, in the illustrated example of FIGS. 5-7, the valve cage 500 includes three (3) uniformly-distributed cage sections 504 and three uniformly-distributed (3) joints 512, with each of the three (3) cage sections 504 having an arc length equal to approximately one-third of the circumference 502 of the valve cage 500.

In other examples, the valve cage 500 of FIGS. 5-7 may include a different number of cage sections 504 and a different corresponding number of joints 512 relative to the number of cage sections 504 and joints 512 shown in FIGS. 5-7. For example, the valve cage 500 of FIGS. 5-7 can alternatively be configured to include only two (2) uniformly-distributed cage sections 504 and only two (2) uniformly-distributed joints 512, with each of the two (2) cage sections 504 having an arc length equal to approximately one-half of the circumference 502 of the valve cage 500. As another example, the valve cage 500 of FIGS. 5-7 can alternatively be configured to include four (4) uniformly-distributed cage sections 504 and four (4) uniformly-distributed joints 512, with each of the four (4) cage sections 504 having an arc length equal to approximately one-fourth of the circumference 502 of the valve cage 500.

In still other examples, the valve cage 500 may include cage sections 504 that are not uniformly distributed, and/or that have differing arc lengths. For example, the valve cage 500 of FIGS. 5-7 can alternatively be configured to include two (2) non-uniformly-distributed cage sections 504 and two (2) non-uniformly-distributed joints 512, with a first one of the two (2) cage sections 504 having an arc length equal to approximately one-third of the circumference 502 of the valve cage 500, and a second one of the two (2) cage sections 504 having an arc length equal to approximately two-thirds of the circumference 502 of the valve cage 500. As another example, the valve cage 500 of FIGS. 5-7 can alternatively be configured to include three (3) non-uniformly-distributed cage sections 504 and three (3) non-uniformly-distributed joints 512, with a first one of the three (3) cage sections 504 having an arc length equal to approximately one-fourth of the circumference 502 of the valve cage 500, a second one of the three (3) cage sections 504 having an arc length equal to approximately one-fourth of the circumference 502 of the valve cage 500, and a third one of the three (3) cage sections 504 having an arc length equal to approximately one-half of the circumference 502 of the valve cage 500.

Figure 8:
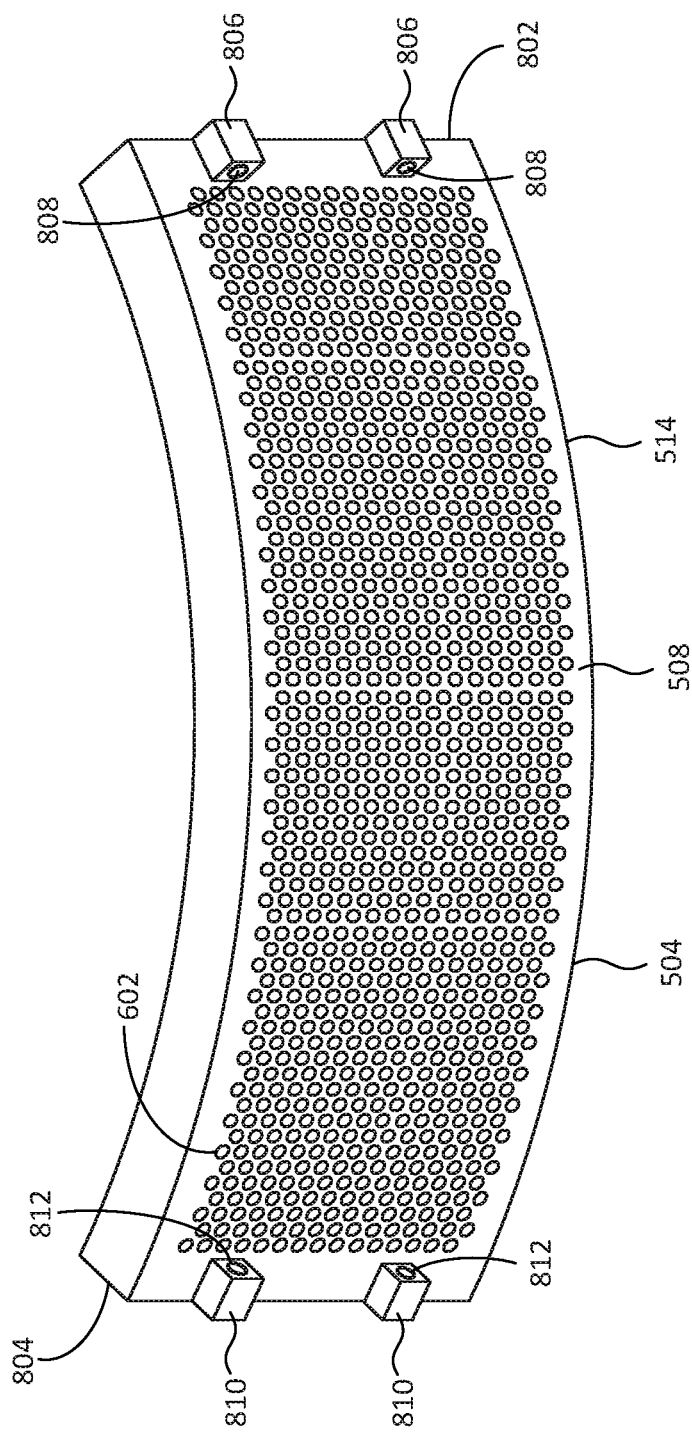
FIG. 8 is an isolated perspective view of one of the cage sections of the valve cage of FIGS. 5-7.

FIG. 8 is an isolated perspective view of the first cage section 514 of the valve cage 500 of FIGS. 5-7. The second cage section 516 and the third cage section 518 of the valve cage 500 of FIGS. 5-7 are structured and/or configured in a manner that is substantially identical to that of the first cage section 514 shown and described in connection with FIG. 8. As shown in FIG. 8, the first cage section 514 includes a first example end 802 and a second example end 804 located opposite the first end 802. First example flanges 806 are formed and/or located at the first end 802 of the first cage section 514 such that the first flanges 806 extend outwardly from the sidewall 508 of the first cage section 514 proximate the first end 802 of the first cage section 514. Respective ones of the first flanges 806 are axially spaced apart from one another (e.g., along the axial direction 604 of FIG. 6). Each of the first flanges 806 includes a first example transversely-oriented opening 808 (e.g., a bore or through-hole extending in a direction transverse to the axial direction 604 of FIG. 6).

As further shown in FIG. 8, second example flanges 810 are formed and/or located at the second end 804 of the first cage section 514 such that the second flanges 810 extend outwardly from the sidewall 508 of the first cage section 514 proximate the second end 804 of the first cage section 514. Respective ones of the second flanges 810 are axially spaced apart from one another (e.g., along the axial direction 604 of FIG. 6). Each of the second flanges 810 includes a second example transversely-oriented opening 812 (e.g., a bore or through-hole extending in a direction transverse to the axial direction 604 of FIG. 6).

The first cage section 514 of the valve cage 500 is structured and/or configured such that the respective axial locations of the second flanges 810 of the first cage section 514 are transversely aligned with the respective axial locations of the first flanges 806 of the first cage section 514. The second cage section 516 and the third cage section 518 are structured and/or configured in a substantially identical manner, thereby enabling respective ones of the first flanges 806 of the first cage section 514 shown in FIG. 4 to be transversely aligned with and placed adjacent to corresponding respective ones of the second flanges 810 of the second cage section 516 of the valve cage 500, further enabling respective ones of the second flanges 810 of the first cage section 514 shown in FIG. 8 to be transversely aligned with and placed adjacent to corresponding respective ones of the first flanges 806 of the third cage section 518 of the valve cage 500, and still further enabling respective ones of the first flanges 806 of the second cage section 516 of the valve cage 500 to be transversely aligned with and placed adjacent to corresponding respective ones of the second flanges 810 of the third cage section 518.

When respective ones of the first flanges 806 of the first cage section 514 shown in FIG. 8 are transversely aligned with and placed adjacent to corresponding respective ones of the second flanges 810 of the second cage section 516 of the valve cage 500 (e.g., as shown in FIGS. 5-7), the first transversely-oriented openings 808 of the respective ones of the first flanges 806 of the first cage section 514 are transversely aligned with the second transversely-oriented openings 812 of the respective ones of the second flanges 810 of the second cage section 516. Transverse alignment between the first transversely-oriented openings 808 of the respective ones of the first flanges 806 of the first cage section 514 and the second transversely-oriented openings 812 of the respective ones of the second flanges 810 of the second cage section 516 enables respective ones of the first bolts 520 to be disposed through and/or within respective ones of the aligned transversely-oriented openings. When so disposed, the first bolts 520 removably couple the first cage section 514 to the second cage section 516.

When respective ones of the first flanges 806 of the second cage section 516 of the valve cage 500 are transversely aligned with and placed adjacent to corresponding respective ones of the second flanges 810 of the third cage section 518 of the valve cage 500, the first transversely-oriented openings 808 of the respective ones of the first flanges 806 of the second cage section 516 are transversely aligned with the second transversely-oriented openings 812 of the respective ones of the second flanges 810 of the third cage section 518. Transverse alignment between the first transversely-oriented openings 808 of the respective ones of the first flanges 806 of the second cage section 516 and the second transversely-oriented openings 812 of the respective ones of the second flanges 810 of the third cage section 518 enables respective ones of the second bolts 522 to be disposed through and/or within respective ones of the aligned transversely-oriented openings. When so disposed, the second bolts 522 removably couple the second cage section 516 to the third cage section 518.

When respective ones of the first flanges 806 of the third cage section 518 of the valve cage 500 are transversely aligned with and placed adjacent to corresponding respective ones of the second flanges 810 of the first cage section 514 shown in FIG. 8, the first transversely-oriented openings 808 of the respective ones of the first flanges 806 of the third cage section 518 are transversely aligned with the second transversely-oriented openings 812 of the respective ones of the second flanges 810 of the first cage section 514. Transverse alignment between the first transversely-oriented openings 808 of the respective ones of the first flanges 806 of the third cage section 518 and the second transversely-oriented openings 812 of the respective ones of the second flanges 810 of the first cage section 514 enables respective ones of the third bolts 524 to be disposed through and/or within respective ones of the aligned transversely-oriented openings. When so disposed, the third bolts 524 removably couple the third cage section 518 to the first cage section 514.

Figure 9:
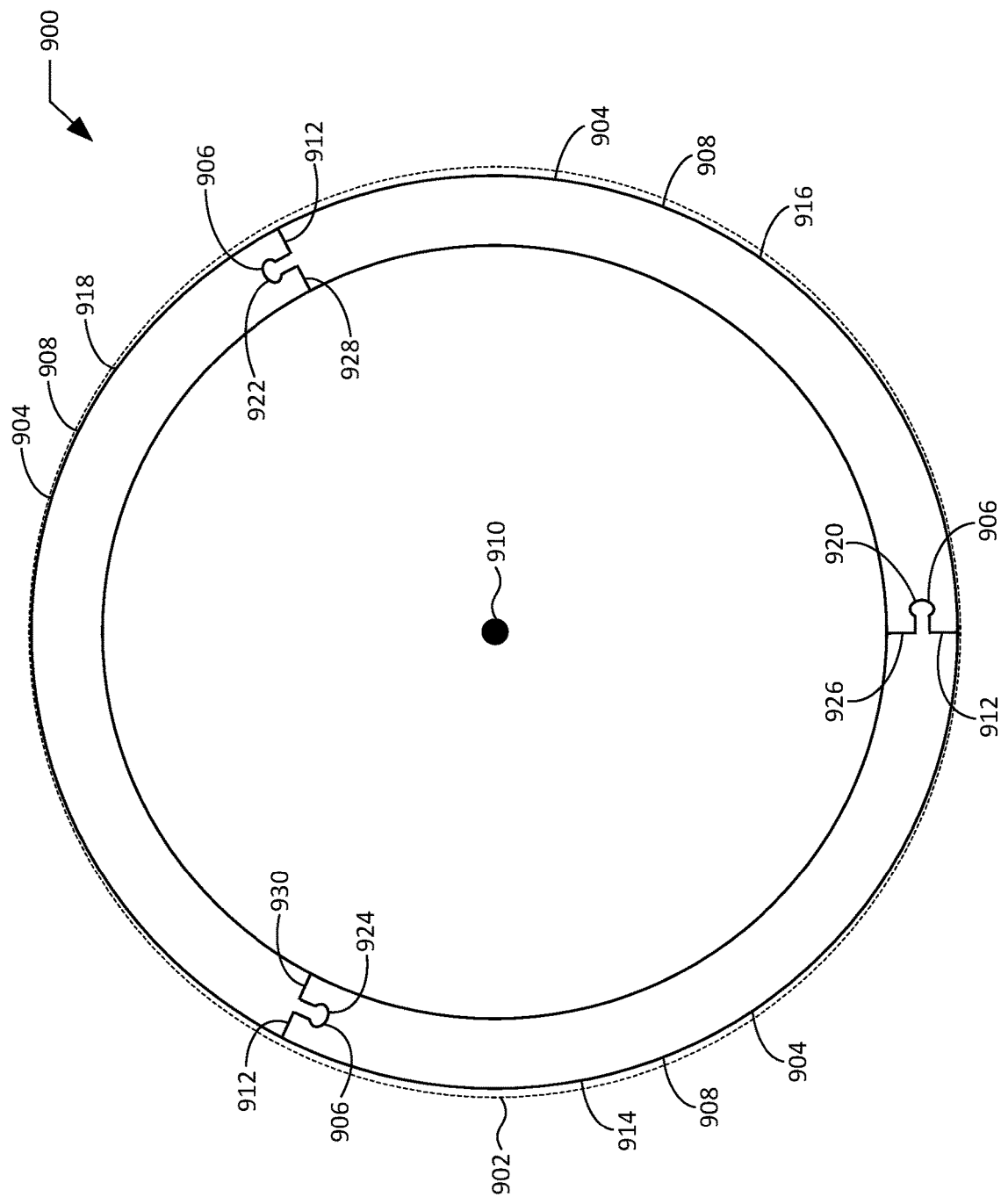
FIG. 9 is a plan view of a third example valve cage.
Figure 10:
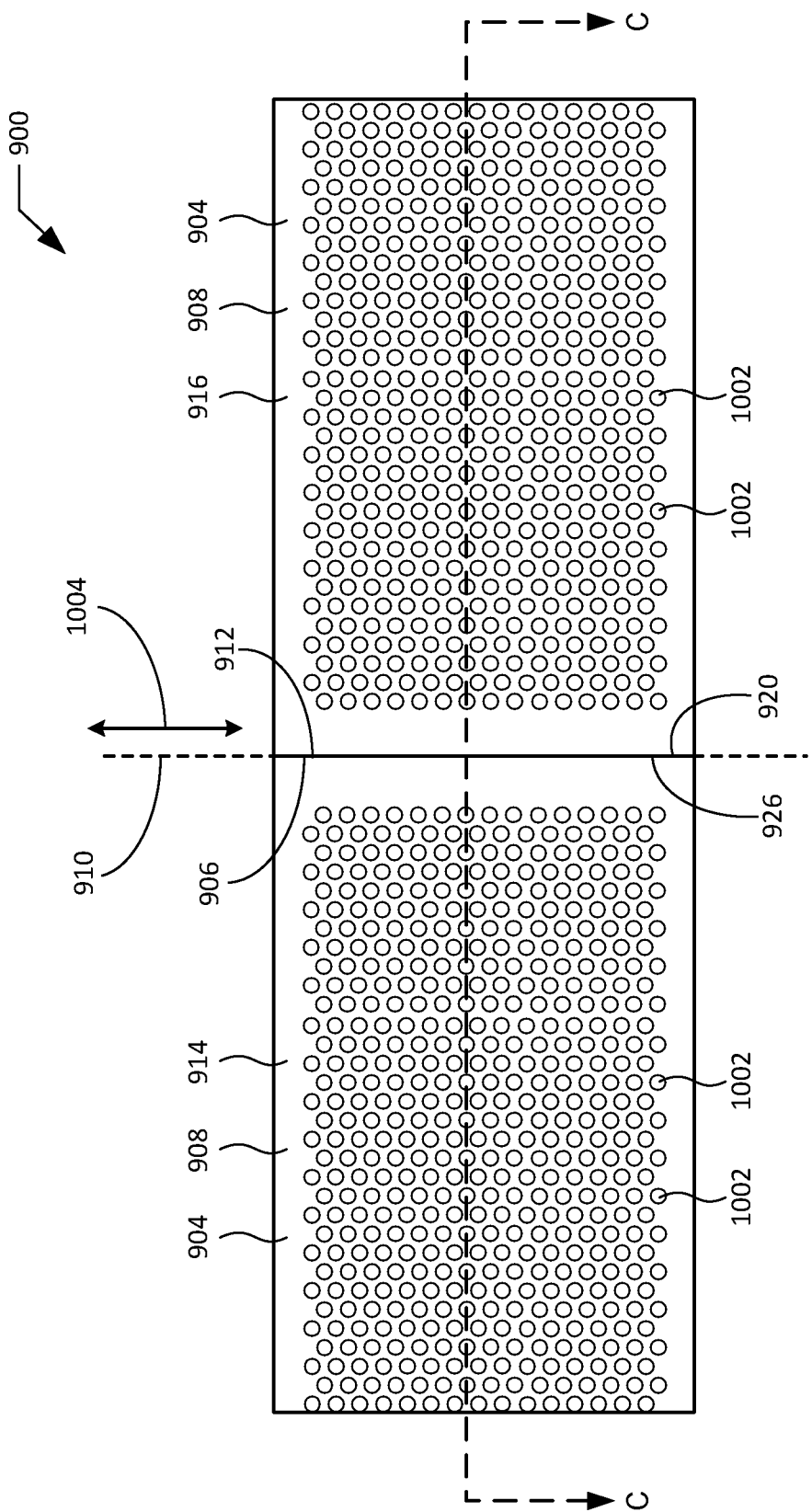
FIG. 10 is a side view of the valve cage of FIG. 9.
Figure 11:
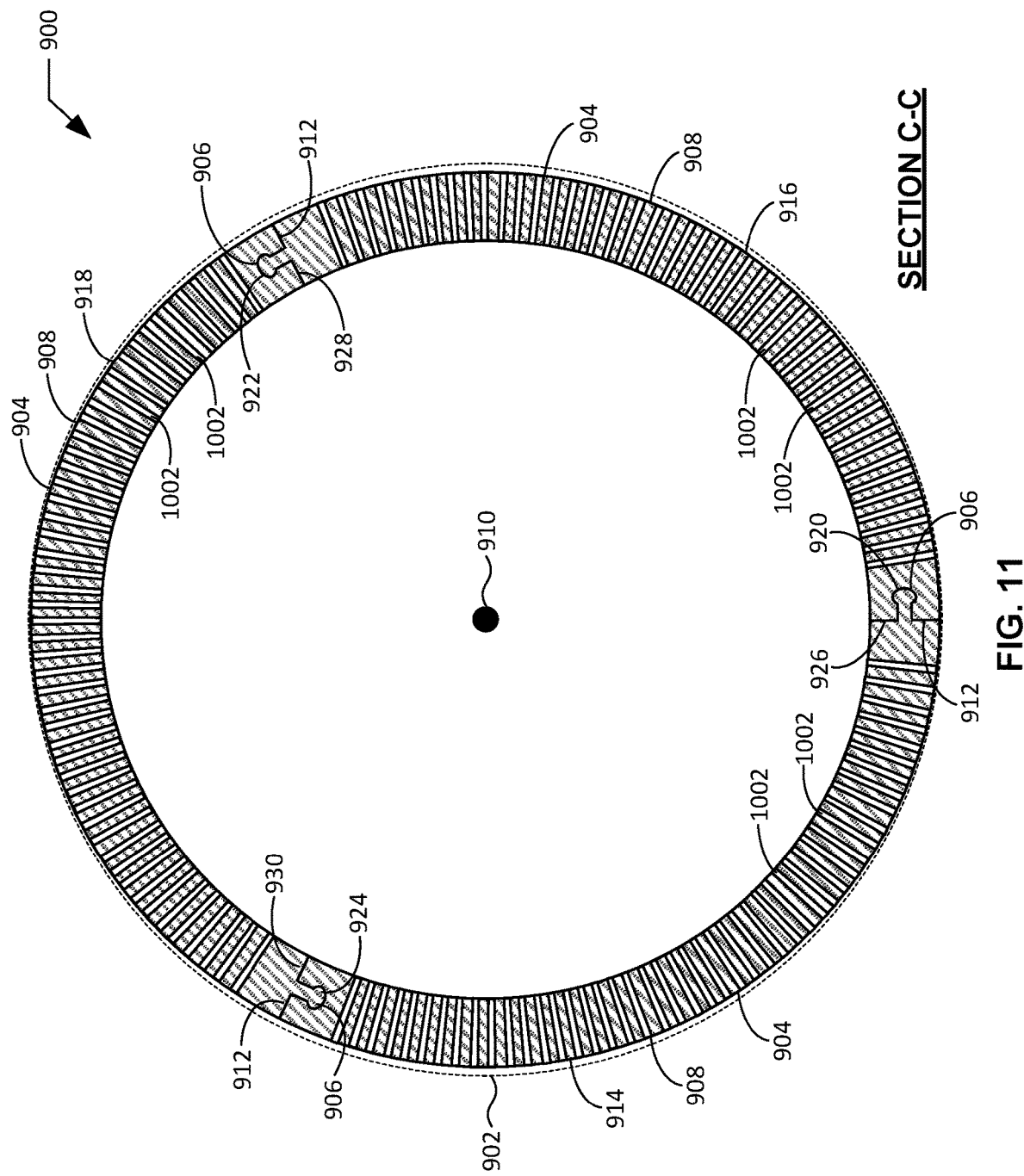
FIG. 11 is a cross-sectional view of the valve cage of FIGS. 9 and 10 taken along section C-C of FIG. 10.

FIG. 9 is a plan view of a third example valve cage 900. FIG. 10 is a side view of the valve cage 900 of FIG. 9. FIG. 11 is a cross-sectional view of the valve cage 900 of FIGS. 9 and 10 taken along section C-C of FIG. 10. The valve cage 900 of FIGS. 9-11 is a circumferentially-sectioned valve cage having an example circumference 902 formed by a plurality of example cage sections 904 that are removably coupled to one another via example interlocked tab-and-blank connections 906, as further described below. In some examples, the diameter of the valve cage 900 of FIGS. 9-11 may exceed eighteen inches.

Each cage section 904 of the valve cage 900 of FIGS. 9-11 is fabricated using an additive manufacturing process, with each resultant cage section 904 being integrally formed as a single-piece structure having the features described herein. In some examples, respective ones of the cage sections 904 of the valve cage 900 of FIGS. 9-11 are fabricated within a common build envelope and/or on a common build platform of a 3D-printer system during a single build performed using an additive manufacturing process. In some such examples, each of the cage sections 904 is fabricated such that first ends of the cage sections 904 are aligned with one another within the build envelope and/or on the build platform, second ends of the cage sections 904 are aligned with one another within the build envelope and/or on the build platform, and curvatures of the cage sections 904 extending between the first and second ends of the cage sections 904 are commonly oriented within the build envelope and/or on the build platform. In other examples, one or more of the cage sections 904 of the valve cage 900 of FIGS. 9-11 may alternatively be fabricated using one or more casting, molding, milling, forging and/or drilling processes, with each resultant cage section 904 being integrally formed as a single-piece structure having the features described herein.

As shown in FIGS. 10 and 11, each cage section 904 includes a plurality of example openings 1002 (e.g., through-holes) formed in and/or extending through an example sidewall 908 of the cage section 904. The openings 1002 of each sidewall 908 are configured to enable fluid to pass through the sidewall 908 (e.g., from an outer surface of the sidewall 908 to an inner surface of the sidewall 908). The openings 1002 can be formed and/or configured as passages of any size, shape, geometry and/or pattern that enable fluid to pass through the sidewall 908. In the illustrated example of FIGS. 9-11, the sidewalls 908 and/or, more generally, the cage sections 904 of the valve cage 900 define a cylindrical shape having an example central axis 910 and a circular cross-section perpendicular to the central axis 910. In other examples, the sidewalls 908 and/or, more generally, the cage sections 904 of the valve cage 900 may alternatively define a cylindrical shape having an oval or elliptical cross-section perpendicular to the central axis 910.

The valve cage 900 of FIGS. 9-11 further includes a plurality of example joints 912. The joints 912 correspond in number to the cage sections 904, and are spaced apart from one another about the circumference 902 of the valve cage 900 at locations defined by neighboring ones of the cage sections 904. As shown in FIG. 10, the joints 912 of the valve cage 900 extend along an example axial direction 1004 defined by and/or parallel to the central axis 910 of the valve cage 900. In other examples, the joints 912 of the valve cage 900 may alternatively extend in a direction that lies at a non-parallel angle relative to the central axis 910 of the valve cage 900.

In the illustrated example of FIGS. 9-11, the cage sections 904 of the valve cage 900 include a first example cage section 914, a second example cage section 916, and a third example cage section 918. The interlocked tab-and-blank connections 906 of the valve cage 900 include a first example interlocked tab-and-blank connection 920, a second example interlocked tab-and-blank connection 922, and a third example interlocked tab-and-blank connection 924. The joints 912 of the valve cage 900 include a first example joint 926, a second example joint 928, and a third example joint 930. The first cage section 914 is removably coupled to the second cage section 916 at the first joint 926 via the first interlocked tab-and-blank connection 920, and is further removably coupled to the third cage section 918 at the third joint 930 via the third interlocked tab-and-blank connection 924. The second cage section 916 is removably coupled to the third cage section 918 at the second joint 928 via the second interlocked tab-and-blank connection 922, and is further removably coupled to the first cage section 914 at the first joint 926 via the first interlocked tab-and-blank connection 920. The third cage section 918 is removably coupled to the first cage section 914 at the third joint 930 via the third interlocked tab-and-blank connection 924, and is further removably coupled to the second cage section 916 at the second joint 928 via the second interlocked tab-and-blank connection 922.

Each of the first, second and third cage sections 914, 916, 918 of the valve cage 900 of FIGS. 9-11 has an arc length (e.g., measured along an outer surface of the sidewall 908) equal to approximately one-third of the circumference 902 of the valve cage 900. In the illustrated example of FIGS. 9-11, the first, second and third cage sections 914, 916, 918 of the valve cage 900 are uniformly distributed (e.g., equally spaced) about the circumference 902 of the valve cage 900 relative to the central axis 910 of the valve cage 900. The first, second and third joints 926, 928, 930 of the valve cage 900 are also uniformly distributed (e.g., equally spaced) about the circumference 902 of the valve cage 900 relative to the central axis 910 of the valve cage 900. Thus, in the illustrated example of FIGS. 9-11, the valve cage 900 includes three (3) uniformly-distributed cage sections 904 and three uniformly-distributed (3) joints 912, with each of the three (3) cage sections 904 having an arc length equal to approximately one-third of the circumference 902 of the valve cage 900.

In other examples, the valve cage 900 of FIGS. 9-11 may include a different number of cage sections 904 and a different corresponding number of joints 912 relative to the number of cage sections 904 and joints 912 shown in FIGS. 9-11. For example, the valve cage 900 of FIGS. 9-11 can alternatively be configured to include only two (2) uniformly-distributed cage sections 904 and only two (2) uniformly-distributed joints 912, with each of the two (2) cage sections 904 having an arc length equal to approximately one-half of the circumference 902 of the valve cage 900. As another example, the valve cage 900 of FIGS. 9-11 can alternatively be configured to include four (4) uniformly-distributed cage sections 904 and four (4) uniformly-distributed joints 912, with each of the four (4) cage sections 904 having an arc length equal to approximately one-fourth of the circumference 902 of the valve cage 900.

In still other examples, the valve cage 900 may include cage sections 904 that are not uniformly distributed, and/or that have differing arc lengths. For example, the valve cage 900 of FIGS. 9-11 can alternatively be configured to include two (2) non-uniformly-distributed cage sections 904 and two (2) non-uniformly-distributed joints 912, with a first one of the two (2) cage sections 904 having an arc length equal to approximately one-third of the circumference 902 of the valve cage 900, and a second one of the two (2) cage sections 904 having an arc length equal to approximately two-thirds of the circumference 902 of the valve cage 900. As another example, the valve cage 900 of FIGS. 9-11 can alternatively be configured to include three (3) non-uniformly-distributed cage sections 904 and three (3) non-uniformly-distributed joints 912, with a first one of the three (3) cage sections 904 having an arc length equal to approximately one-fourth of the circumference 902 of the valve cage 900, a second one of the three (3) cage sections 904 having an arc length equal to approximately one-fourth of the circumference 902 of the valve cage 900, and a third one of the three (3) cage sections 904 having an arc length equal to approximately one-half of the circumference 902 of the valve cage 900.

Figure 12:
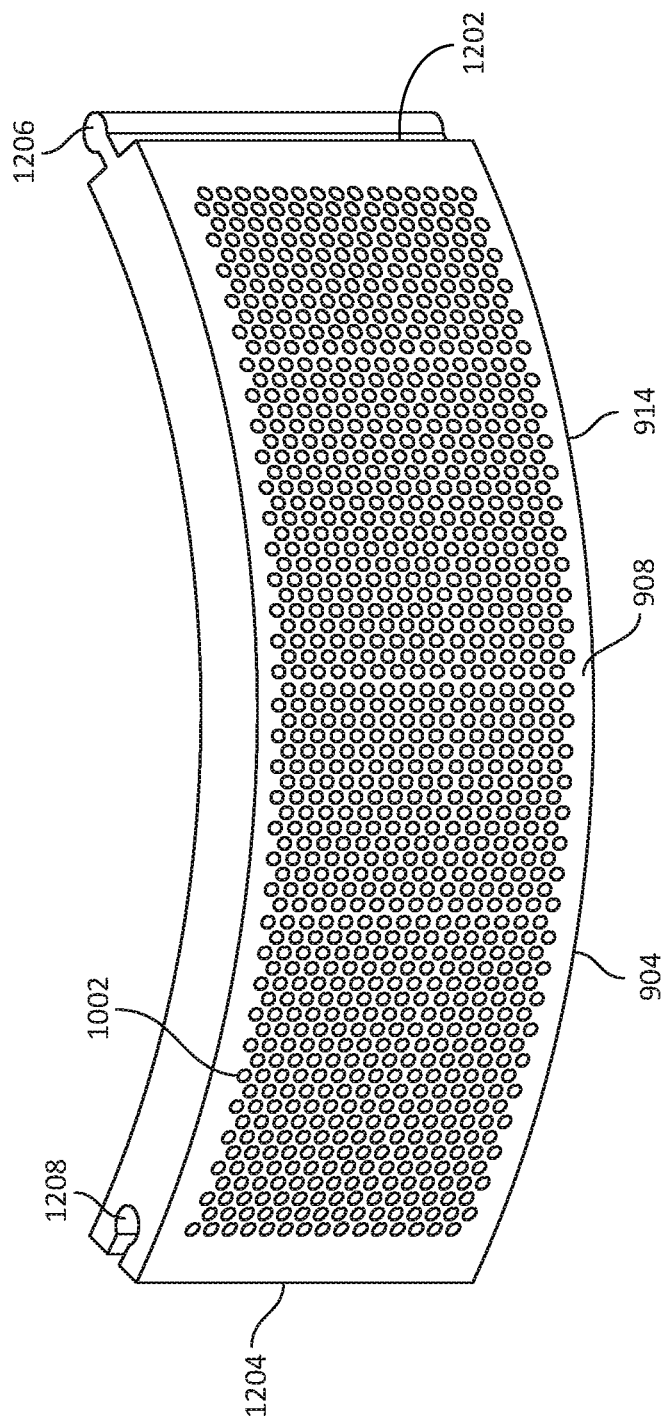
FIG. 12 is an isolated perspective view of one of the cage sections of the valve cage of FIGS. 9-11.

FIG. 12 is an isolated perspective view of the first cage section 914 of the valve cage 900 of FIGS. 9-11. The second cage section 916 and the third cage section 918 of the valve cage 900 of FIGS. 9-11 are structured and/or configured in a manner that is substantially identical to that of the first cage section 914 shown and described in connection with FIG. 12. As shown in FIG. 12, the first cage section 914 includes a first example end 1202 and a second example end 1204 located opposite the first end 1202. An example tab 1206 is formed and/or located at the first end 1202 of the first cage section 914 such that the tab 1206 extends circumferentially away from the first end 1202 of the first cage section 914. An example blank 1208 is formed and/or located at the second end 1204 of the first cage section 914 such that the blank 1208 is recessed circumferentially into the second end 1204 of the first cage section 914. As shown in FIG. 12, the tab 1206 and the blank 1208 respectively extend along the substantial entirety of the axial dimension of the first cage section 914. In other examples, the tab 1206 and/or the blank 1208 may alternatively extend along only a portion of the axial dimension of the first cage section 914.

The first cage section 914 of the valve cage 900 is structured and/or configured such that the shape and/or profile of the blank 1208 of the first cage section 914 is complementary to (e.g., is a negative of) the shape and/or profile of the tab 1206 of the first cage section 914. The second cage section 916 and the third cage section 918 are structured and/or configured in a substantially identical manner, thereby enabling the tab 1206 of the first cage section 914 shown in FIG. 12 to be axially disposed in and transversely locked relative to the blank 1208 of the second cage section 916 of the valve cage 900, further enabling the tab 1206 of the second cage section 916 of the valve cage 900 to be axially disposed in and transversely locked relative to the blank 1208 of the third cage section 918 of the valve cage 900, and still further enabling the tab 1206 of the third cage section 918 of the valve cage 900 to be axially disposed in and transversely locked relative to the blank 1208 of the first cage section 914 shown in FIG. 12.

When the tab 1206 of the first cage section 914 shown in FIG. 12 is interlocked with (e.g., axially disposed in and transversely locked relative to) the blank 1208 of the second cage section 916 of the valve cage 900 (e.g., as shown in FIGS. 9-11), the tab 1206 of the first cage section 914 and the blank 1208 of the second cage section 916 collectively form the first interlocked tab-and-blank connection 920. The first interlocked tab-and-blank connection 920 removably couples the first cage section 914 to the second cage section 916.

When the tab 1206 of the second cage section 916 of the valve cage 900 is interlocked with (e.g., axially disposed in and transversely locked relative to) the blank 1208 of the third cage section 918 of the valve cage 900, the tab 1206 of the second cage section 916 and the blank 1208 of the third cage section 918 collectively form the second interlocked tab-and-blank connection 922. The second interlocked tab-and-blank connection 922 removably couples the second cage section 916 to the third cage section 918.

When the tab 1206 of the third cage section 918 of the valve cage 900 is interlocked with (e.g., axially disposed in and transversely locked relative to) the blank 1208 of the first cage section 914 shown in FIG. 12, the tab 1206 of the third cage section 918 and the blank 1208 of the first cage section 914 collectively form the third interlocked tab-and-blank connection 924. The third interlocked tab-and-blank connection 924 removably couples the third cage section 918 to the first cage section 914.

Figure 13:
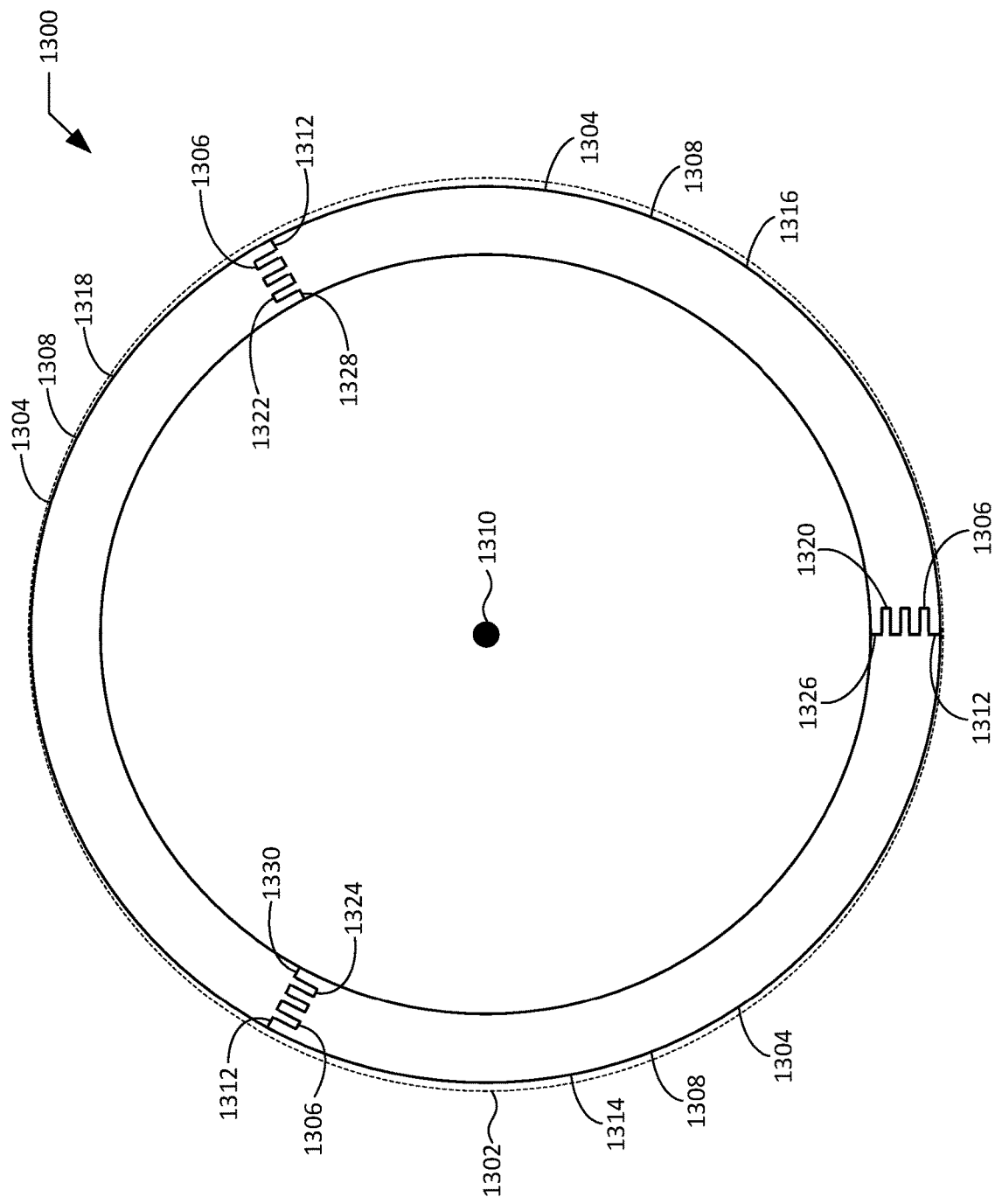
FIG. 13 is a plan view of a fourth example valve cage.
Figure 14:
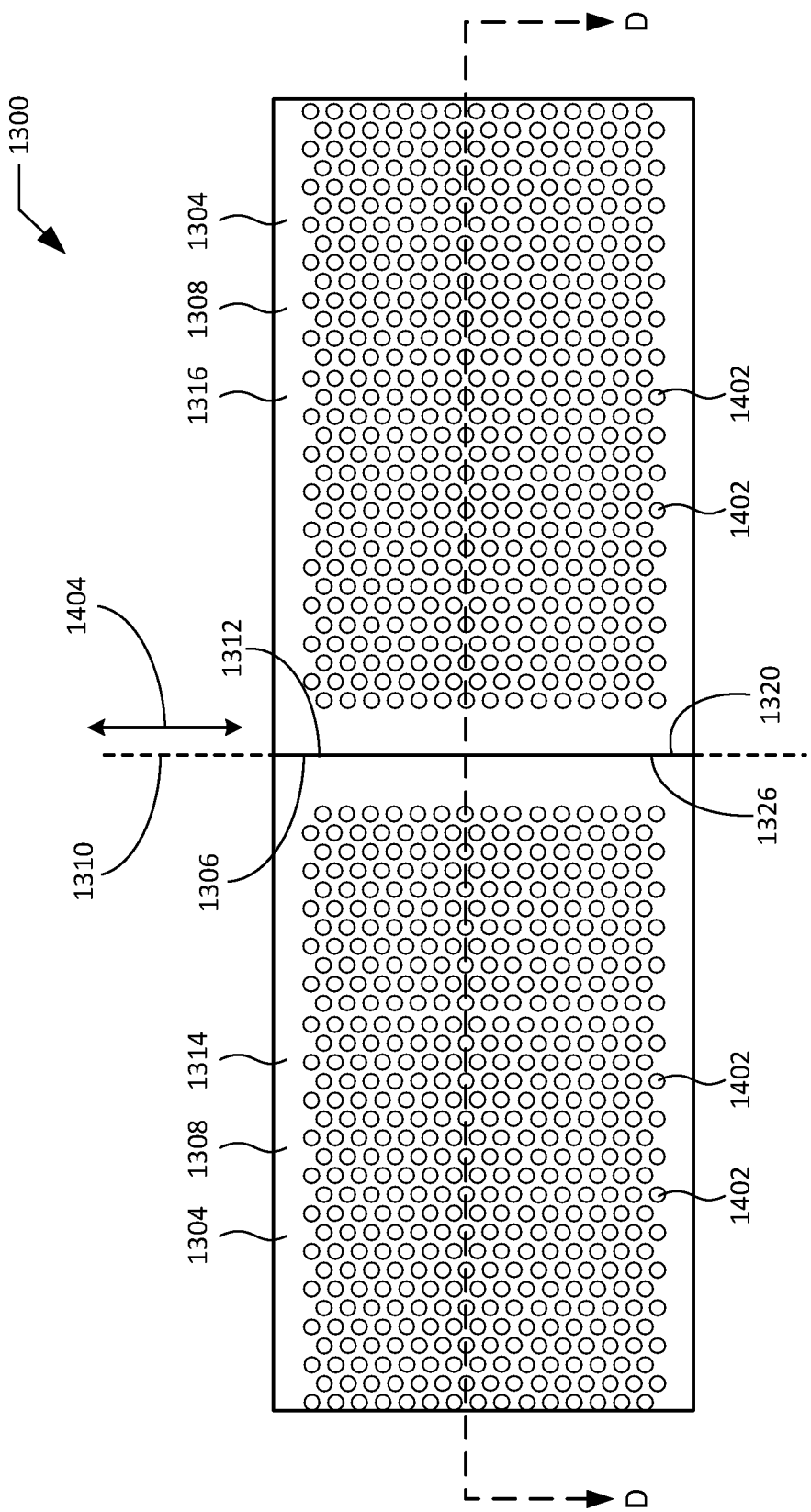
FIG. 14 is a side view of the valve cage of FIG. 13.
Figure 15:
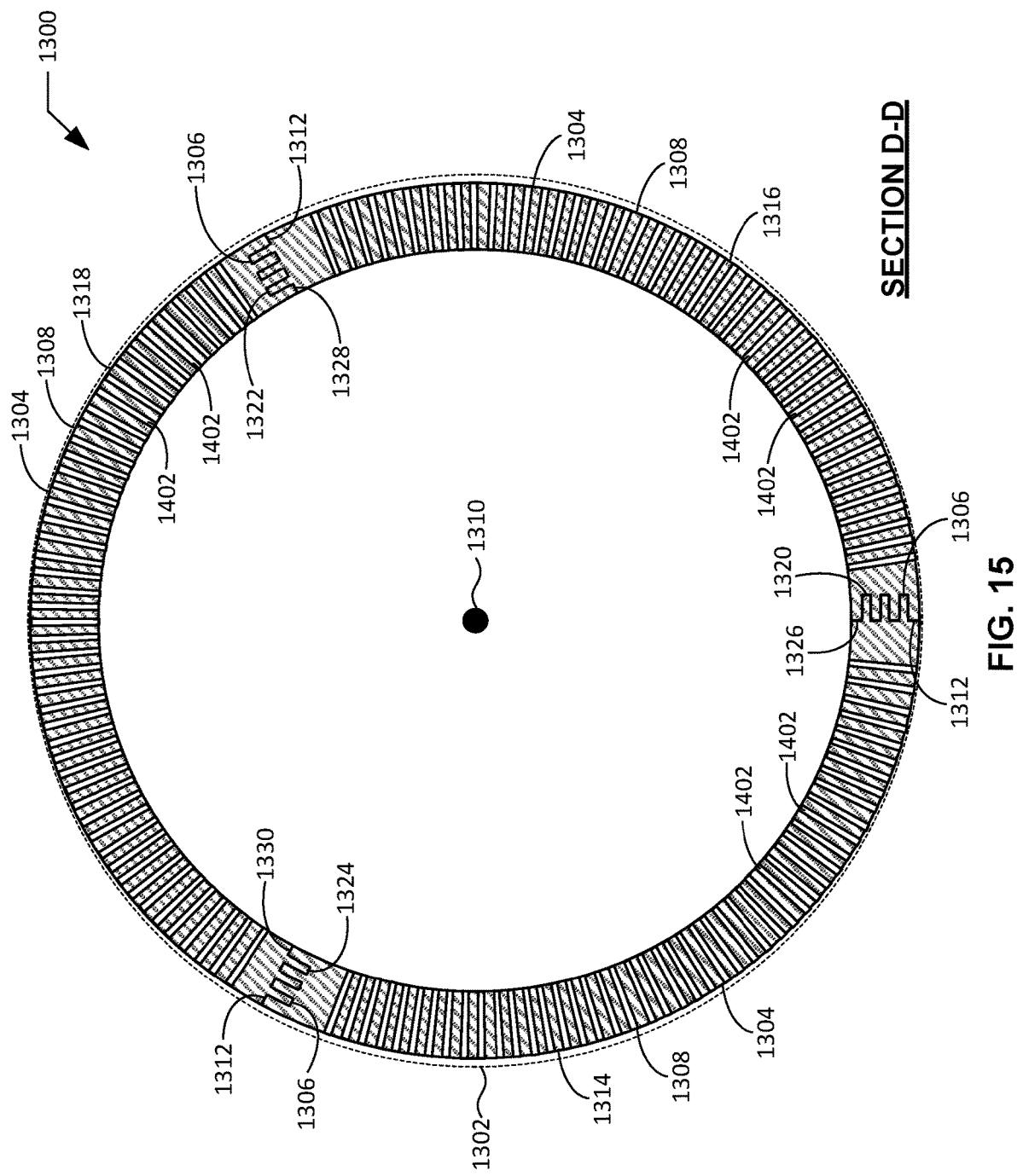
FIG. 15 is a cross-sectional view of the valve cage of FIGS. 13 and 14 taken along section D-D of FIG. 14.

FIG. 13 is a plan view of a fourth example valve cage 1300. FIG. 14 is a side view of the valve cage 1300 of FIG. 13. FIG. 15 is a cross-sectional view of the valve cage 1300 of FIGS. 13 and 14 taken along section D-D of FIG. 14. The valve cage 1300 of FIGS. 13-15 is a circumferentially-sectioned valve cage having an example circumference 1302 formed by a plurality of example cage sections 1304 that are removably coupled to one another via example frictional tongue-and-groove connections 1306, as further described below. In some examples, the diameter of the valve cage 1300 of FIGS. 13-15 may exceed eighteen inches.

Each cage section 1304 of the valve cage 1300 of FIGS. 13-15 is fabricated using an additive manufacturing process, with each resultant cage section 1304 being integrally formed as a single-piece structure having the features described herein. In some examples, respective ones of the cage sections 1304 of the valve cage 1300 of FIGS. 13-15 are fabricated within a common build envelope and/or on a common build platform of a 3D-printer system during a single build performed using an additive manufacturing process. In some such examples, each of the cage sections 1304 is fabricated such that first ends of the cage sections 1304 are aligned with one another within the build envelope and/or on the build platform, second ends of the cage sections 1304 are aligned with one another within the build envelope and/or on the build platform, and curvatures of the cage sections 1304 extending between the first and second ends of the cage sections 1304 are commonly oriented within the build envelope and/or on the build platform. In other examples, one or more of the cage sections 1304 of the valve cage 1300 of FIGS. 13-15 may alternatively be fabricated using one or more casting, molding, milling, forging and/or drilling processes, with each resultant cage section 1304 being integrally formed as a single-piece structure having the features described herein.

As shown in FIGS. 14 and 15, each cage section 1304 includes a plurality of example openings 1402 (e.g., through-holes) formed in and/or extending through an example sidewall 1308 of the cage section 1304. The openings 1402 of each sidewall 1308 are configured to enable fluid to pass through the sidewall 1308 (e.g., from an outer surface of the sidewall 1308 to an inner surface of the sidewall 1308). The openings 1402 can be formed and/or configured as passages of any size, shape, geometry and/or pattern that enable fluid to pass through the sidewall 1308. In the illustrated example of FIGS. 13-15, the sidewalls 1308 and/or, more generally, the cage sections 1304 of the valve cage 1300 define a cylindrical shape having an example central axis 1310 and a circular cross-section perpendicular to the central axis 1310. In other examples, the sidewalls 1308 and/or, more generally, the cage sections 1304 of the valve cage 1300 may alternatively define a cylindrical shape having an oval or elliptical cross-section perpendicular to the central axis 1310.

The valve cage 1300 of FIGS. 13-15 further includes a plurality of example joints 1312. The joints 1312 correspond in number to the cage sections 1304, and are spaced apart from one another about the circumference 1302 of the valve cage 1300 at locations defined by neighboring ones of the cage sections 1304. As shown in FIG. 14, the joints 1312 of the valve cage 1300 extend along an example axial direction 1404 defined by and/or parallel to the central axis 1310 of the valve cage 1300. In other examples, the joints 1312 of the valve cage 1300 may alternatively extend in a direction that lies at a non-parallel angle relative to the central axis 1310 of the valve cage 1300.

In the illustrated example of FIGS. 13-15, the cage sections 1304 of the valve cage 1300 include a first example cage section 1314, a second example cage section 1316, and a third example cage section 1318. The frictional tongue-and-groove connections 1306 of the valve cage 1300 include a first example frictional tongue-and-groove connection 1320, a second example frictional tongue-and-groove connection 1322, and a third example frictional tongue-and-groove connection 1324. The joints 1312 of the valve cage 1300 include a first example joint 1326, a second example joint 1328, and a third example joint 1330. The first cage section 1314 is removably coupled to the second cage section 1316 at the first joint 1326 via the first frictional tongue-and-groove connection 1320, and is further removably coupled to the third cage section 1318 at the third joint 1330 via the third frictional tongue-and-groove connection 1324. The second cage section 1316 is removably coupled to the third cage section 1318 at the second joint 1328 via the second frictional tongue-and-groove connection 1322, and is further removably coupled to the first cage section 1314 at the first joint 1326 via the first frictional tongue-and-groove connection 1320. The third cage section 1318 is removably coupled to the first cage section 1314 at the third joint 1330 via the third frictional tongue-and-groove connection 1324, and is further removably coupled to the second cage section 1316 at the second joint 1328 via the second frictional tongue-and-groove connection 1322.

Each of the first, second and third cage sections 1314, 1316, 1318 of the valve cage 1300 of FIGS. 13-15 has an arc length (e.g., measured along an outer surface of the sidewall 1308) equal to approximately one-third of the circumference 1302 of the valve cage 1300. In the illustrated example of FIGS. 13-15, the first, second and third cage sections 1314, 1316, 1318 of the valve cage 1300 are uniformly distributed (e.g., equally spaced) about the circumference 1302 of the valve cage 1300 relative to the central axis 1310 of the valve cage 1300. The first, second and third joints 1326, 1328, 1330 of the valve cage 1300 are also uniformly distributed (e.g., equally spaced) about the circumference 1302 of the valve cage 1300 relative to the central axis 1310 of the valve cage 1300. Thus, in the illustrated example of FIGS. 13-15, the valve cage 1300 includes three (3) uniformly-distributed cage sections 1304 and three uniformly-distributed (3) joints 1312, with each of the three (3) cage sections 1304 having an arc length equal to approximately one-third of the circumference 1302 of the valve cage 1300.

In other examples, the valve cage 1300 of FIGS. 13-15 may include a different number of cage sections 1304 and a different corresponding number of joints 1312 relative to the number of cage sections 1304 and joints 1312 shown in FIGS. 13-15. For example, the valve cage 1300 of FIGS. 13-15 can alternatively be configured to include only two (2) uniformly-distributed cage sections 1304 and only two (2) uniformly-distributed joints 1312, with each of the two (2) cage sections 1304 having an arc length equal to approximately one-half of the circumference 1302 of the valve cage 1300. As another example, the valve cage 1300 of FIGS. 13-15 can alternatively be configured to include four (4) uniformly-distributed cage sections 1304 and four (4) uniformly-distributed joints 1312, with each of the four (4) cage sections 1304 having an arc length equal to approximately one-fourth of the circumference 1302 of the valve cage 1300.

In still other examples, the valve cage 1300 may include cage sections 1304 that are not uniformly distributed, and/or that have differing arc lengths. For example, the valve cage 1300 of FIGS. 13-15 can alternatively be configured to include two (2) non-uniformly-distributed cage sections 1304 and two (2) non-uniformly-distributed joints 1312, with a first one of the two (2) cage sections 1304 having an arc length equal to approximately one-third of the circumference 1302 of the valve cage 1300, and a second one of the two (2) cage sections 1304 having an arc length equal to approximately two-thirds of the circumference 1302 of the valve cage 1300. As another example, the valve cage 1300 of FIGS. 13-15 can alternatively be configured to include three (3) non-uniformly-distributed cage sections 1304 and three (3) non-uniformly-distributed joints 1312, with a first one of the three (3) cage sections 1304 having an arc length equal to approximately one-fourth of the circumference 1302 of the valve cage 1300, a second one of the three (3) cage sections 1304 having an arc length equal to approximately one-fourth of the circumference 1302 of the valve cage 1300, and a third one of the three (3) cage sections 1304 having an arc length equal to approximately one-half of the circumference 1302 of the valve cage 1300.

Figure 16:
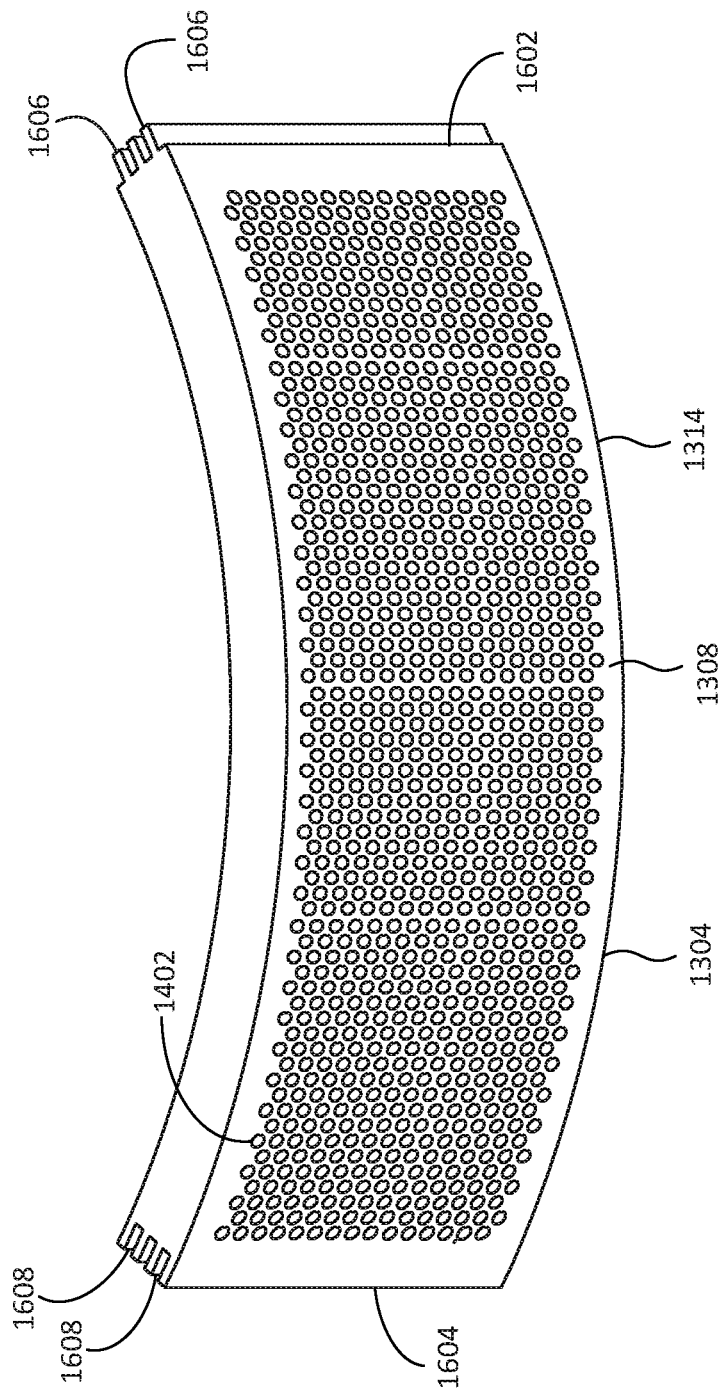
FIG. 16 is an isolated perspective view of one of the cage sections of the valve cage of FIGS. 13-15.

FIG. 16 is an isolated perspective view of the first cage section 1314 of the valve cage 1300 of FIGS. 13-15. The second cage section 1316 and the third cage section 1318 of the valve cage 1300 of FIGS. 13-15 are structured and/or configured in a manner that is substantially identical to that of the first cage section 1314 shown and described in connection with FIG. 16. As shown in FIG. 16, the first cage section 1314 includes a first example end 1602 and a second example end 1604 located opposite the first end 1602. Example tongues 1606 are formed and/or located at the first end 1602 of the first cage section 1314 such that respective ones of the tongues 1606 are radially spaced apart from one another and extend circumferentially away from the first end 1602 of the first cage section 1314. Example grooves 1608 are formed and/or located at the second end 1604 of the first cage section 1314 such that respective ones of the grooves 1608 are radially spaced apart from one another and recessed circumferentially into the second end 1604 of the first cage section 1314. As shown in FIG. 16, the tongues 1606 and the grooves 1608 respectively extend along the substantial entirety of the axial dimension of the first cage section 1314. In other examples, the tongues 1606 and/or the grooves 1608 may alternatively extend along only a portion of the axial dimension of the first cage section 1314.

The first cage section 1314 of the valve cage 1300 is structured and/or configured such that the respective shapes and/or profiles of the grooves 1608 of the first cage section 1314 are complementary to (e.g., are negatives of) the respective shapes and/or profiles of the tongues 1606 of the first cage section 1314. The second cage section 1316 and the third cage section 1318 are structured and/or configured in a substantially identical manner, thereby enabling respective ones of the tongues 1606 of the first cage section 1314 shown in FIG. 16 to be circumferentially disposed in and frictionally retained by corresponding respective ones of the grooves 1608 of the second cage section 1316 of the valve cage 1300, further enabling respective ones of the tongues 1606 of the second section 1316 of the valve cage 1300 to be circumferentially disposed in and frictionally retained by corresponding respective ones of the grooves 1608 of the third cage section 1318 of the valve cage 1300, and still further enabling respective ones of the tongues 1606 of the third cage section 1318 of the valve cage 1300 to be circumferentially disposed in and frictionally retained by corresponding respective ones of the grooves 1608 of the first cage section 1314 shown in FIG. 16.

When the respective ones of the tongues 1606 of the first cage section 1314 shown in FIG. 16 are circumferentially disposed in and frictionally retained by the corresponding respective ones of the grooves 1608 of the second cage section 1316 of the valve cage 1300 (e.g., as shown in FIGS. 13-15), the respective ones of the tongues 1606 of the first cage section 1314 and the corresponding respective ones of the grooves 1608 of the second cage section 1316 collectively form the first frictional tongue-and-groove connection 1320. The first frictional tongue-and-groove connection 1320 removably couples the first cage section 1314 to the second cage section 1316.

When the respective ones of the tongues 1606 of the second cage section 1316 of the valve cage 1300 are circumferentially disposed in and frictionally retained by the corresponding respective ones of the grooves 1608 of the third cage section 1318 of the valve cage 1300, the respective ones of the tongues 1606 of the second cage section 1316 and the corresponding respective ones of the grooves 1608 of the third cage section 1318 collectively form the second frictional tongue-and-groove connection 1322. The second frictional tongue-and-groove connection 1322 removably couples the second cage section 1316 to the third cage section 1318.

When the respective ones of the tongues 1606 of the third cage section 1318 of the valve cage 1300 are circumferentially disposed in and frictionally retained by the corresponding respective ones of the grooves 1608 of the first cage section 1314 shown in FIG. 16, the respective ones of the tongues 1606 of the third cage section 1318 and the corresponding respective ones of the grooves 1608 of the first cage section 1314 collectively form the third frictional tongue-and-groove connection 1324. The third frictional tongue-and-groove connection 1324 removably couples the third cage section 1318 to the first cage section 1314.

Figure 17:
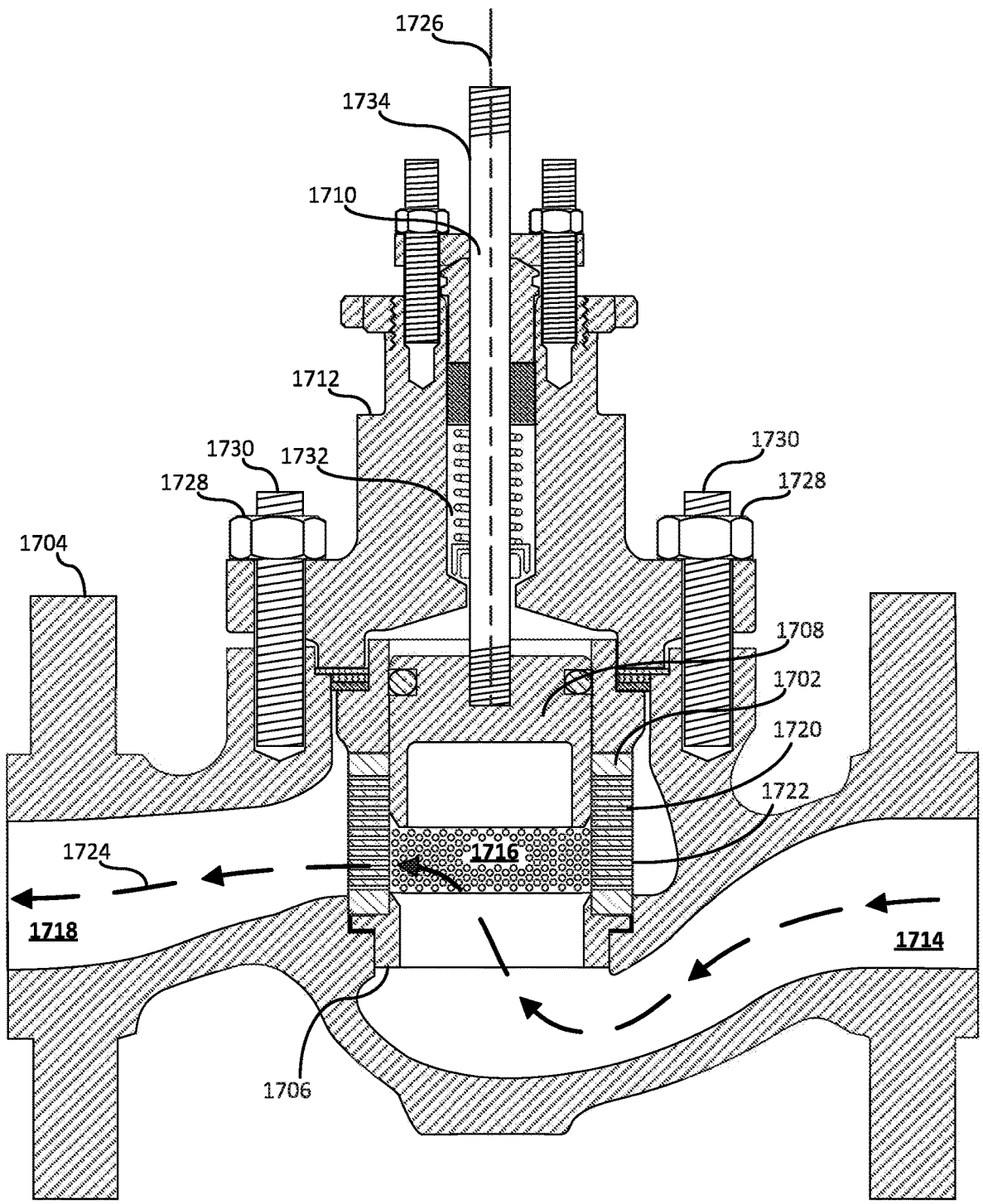
FIG. 17 is a cross-sectional view of an example valve including an example circumferentially-sectioned valve cage.

FIG. 17 is a cross-sectional view of an example valve 1700 including an example circumferentially-sectioned valve cage 1702. The circumferentially-sectioned valve cage 1702 of the valve 1700 of FIG. 17 can be implemented by the first example valve cage 100 of FIGS. 1-4 described above, by the second example valve cage 500 of FIGS. 5-8 described above, by the third example valve cage 900 of FIGS. 9-12 described above, or by the fourth example valve cage 1300 of FIGS. 13-16 described above.

In the illustrated example of FIG. 17, the valve 1700 further includes (e.g., in addition to the circumferentially-sectioned valve cage 1702) an example valve body 1704, an example seat ring 1706, an example plug 1708, an example stem 1710, and an example bonnet 1712. The valve body 1704 includes an example inlet 1714, an example cavity 1716, and an example outlet 1718. The circumferentially-sectioned valve cage 1702, the seat ring 1706, and the plug 1708 are located within the cavity 1716 of the valve body 1704. A fluid flowing through the valve body 1704 and/or, more generally, through the valve 1700 of FIG. 17 enters the inlet 1714, passes through the seat ring 1706 into the cavity 1716, passes from the cavity 1716 through the circumferentially-sectioned valve cage 1702 via example openings 1720 formed in an example sidewall 1722 of the circumferentially-sectioned valve cage 1702, and exits the outlet 1718, as generally indicated by the example fluid pathway 1724 shown in FIG. 17.

The seat ring 1706 of the valve 1700 is configured to mate with the plug 1708 of the valve 1700 when the plug 1708 and/or, more generally, the valve 1700, is in a closed position. As shown in FIG. 17 the plug 1708 and/or, more generally, the valve 1700, is in an open position. The stem 1710 of the valve 1700 is coupled to the plug 1708 by, for example, a threaded connection formed by a threaded end of the stem 1710 and a threaded bore of the plug 1708. The plug 1708 and the stem 1710 are movable and/or slidable within the circumferentially-sectioned valve cage 1702 and relative to the seat ring 1706 of the valve 1700 along an example longitudinal axis 1726 defined by the stem 1710. As the plug 1708 moves and/or slides downward from its current position shown in FIG. 17 past the openings 1720 formed in the sidewall 1722 of the circumferentially-sectioned valve cage 1702, fluid passing through the valve 1700 is restricted and/or blocked. The plug 1708 is configured to mate with the seat ring 1706 to fully close off the fluid pathway 1724 shown in FIG. 17.

The bonnet 1712 of the valve 1700 is removably coupled to the valve body 1704 via a plurality of example nuts 1728 and example bolts and/or threaded studs 1730. When the bonnet 1712 is coupled to the valve body 1704 (e.g., as shown in FIG. 17), the bonnet 1712 confines the circumferentially-sectioned valve cage 1702, the seat ring 1706, and the plug 1708 within the cavity 1716 of the valve body 1704. The stem 1710 passes through an example opening 1732 of the bonnet 1712, and an example portion 1734 of the stem 1710 protrudes externally from the opening 1732 of the bonnet 1712. When the bonnet 1712 is properly coupled to the valve body 1704, the stem 1710 is movable and/or slidable along the longitudinal axis 1726 relative to the seat ring 1706 of the valve 1700.

From the foregoing, it will be appreciated that example circumferentially-sectioned valve cages have been disclosed. The example circumferentially-sectioned valve cages disclosed herein include a plurality of cage sections that are removably couplable to one another to form a circumference of the valve cage. When assembled (e.g., when the cage sections are removably coupled to one another), the example circumferentially-sectioned valve cages disclosed herein include joints corresponding in number to the cage sections, with the joints being spaced apart from one another about the circumference of the valve cage, and respective ones of the joints being defined by neighboring ones of the cage sections. In some examples, the example circumferentially-sectioned valve cages disclosed herein have a diameter exceeding eighteen inches. By fabricating the example circumferentially-sectioned valve cages disclosed herein as a plurality of removably couplable cage sections, as opposed to a single-piece valve cage, the above-described challenges and/or constraints that often arise when fabricating a single-piece valve cage having a relatively large size are advantageously eliminated.

In some examples, an apparatus is disclosed. In some disclosed examples, the apparatus comprises a plurality of cage sections collectively configured to be removably coupled together to form a valve cage having a circumference and a plurality of joints. In some disclosed examples, the joints correspond in number to the cage sections and are spaced apart from one another about the circumference. In some disclosed examples, respective ones of the joints are defined by neighboring ones of the cage sections.

In some disclosed examples of the apparatus, the joints extend in an axial direction defined by a central axis of the valve cage.

In some disclosed examples of the apparatus, respective ones of the cage sections have corresponding arc lengths. In some disclosed examples, respective ones of the corresponding arc lengths are equal to one another.

In some disclosed examples of the apparatus, the cage sections include a first cage section, a second cage section, and a third cage section. In some disclosed examples, the first cage section is configured to be removably coupled to the second and third cage sections. In some disclosed examples, the second cage section is configured to be removably coupled to the first and third cage sections. In some disclosed examples, the third cage section is configured to be removably coupled to the first and second cage sections.

In some disclosed examples of the apparatus, the cage sections include a first cage section and a second cage section. In some disclosed examples, the first cage section including a first arm extending circumferentially away from an end of the first cage section. In some disclosed examples, the first arm has a first axially-oriented opening. In some disclosed examples, the second cage section includes a second arm extending circumferentially away from an end of the second cage section. In some disclosed examples, the second arm has a second axially-oriented opening. In some disclosed examples, the second arm is configured to be interleaved with the first arm. In some disclosed examples, the second axially-oriented opening is configured to align with the first axially-oriented opening. In some disclosed examples, the aligned first and second axially-oriented openings are configured to receive a pin. In some disclosed examples, the pin is configured to removably couple the first cage section to the second cage section.

In some disclosed examples of the apparatus, the cage sections include a first cage section and a second cage section. In some disclosed examples, the first cage section includes a first sidewall and a first flange extending outwardly from the first sidewall. In some disclosed examples, the first flange has a first transversely-oriented opening. In some disclosed examples, the second cage section includes a second sidewall and a second flange extending outwardly from the second sidewall. In some disclosed examples, the second flange has a second transversely-oriented opening configured to align with the first transversely-oriented opening. In some disclosed examples, the aligned first and second transversely-oriented openings are configured to receive a bolt. In some disclosed examples, the bolt is configured to removably couple the first cage section to the second cage section.

In some disclosed examples of the apparatus, the cage sections include a first cage section and a second cage section. In some disclosed examples, the first cage section includes a tab extending circumferentially away from an end of the first cage section. In some disclosed examples, the second cage section includes a blank recessed circumferentially into an end of the second cage section. In some disclosed examples, the blank is configured to axially receive the tab to form an interlocked tab-and-blank connection. In some disclosed examples, the interlocked tab-and-blank connection is configured to removably couple the first cage section to the second cage section.

In some disclosed examples of the apparatus, the cage sections include a first cage section and a second cage section. In some disclosed examples, the first cage section includes a tongue extending circumferentially away from an end of the first cage section. In some disclosed examples, the second cage section includes a groove recessed circumferentially into an end of the second cage section. In some disclosed examples, the groove is configured to receive the tongue to form a frictional tongue-and-groove connection. In some disclosed examples, the frictional tongue-and-groove connection is configured to removably couple the first cage section to the second cage section.

In some examples, a valve cage is disclosed. In some disclosed examples, the valve cage comprises a plurality of cage sections removably coupled together to form a circumference of the valve cage. In some disclosed examples, the valve cage comprises a plurality of joints. In some disclosed examples, the joints correspond in number to the cage sections and are spaced apart from one another about the circumference. In some disclosed examples, respective ones of the joints are defined by neighboring ones of the cage sections.

In some disclosed examples of the valve cage, the joints extend in an axial direction defined by a central axis of the valve cage.

In some disclosed examples of the valve cage, respective ones of the cage sections have corresponding arc lengths. In some disclosed examples, respective ones of the corresponding arc lengths are equal to one another.

In some disclosed examples of the valve cage, the valve cage further comprises a pin. In some disclosed examples, the cage sections include a first cage section and a second cage section. In some disclosed examples, the first cage section includes a first arm extending circumferentially away from an end of the first cage section. In some disclosed examples, the first arm has a first axially-oriented opening. In some disclosed examples, the second cage section includes a second arm extending circumferentially away from an end of the second cage section. In some disclosed examples, the second arm has a second axially-oriented opening. In some disclosed examples, the second arm is interleaved with the first arm. In some disclosed examples, the second axially-oriented opening is aligned with the first axially-oriented opening. In some disclosed examples, the pin is disposed in the first and second axially-oriented openings. In some disclosed examples, the pin removably couples the first cage section to the second cage section.

In some disclosed examples of the valve cage, the valve cage further comprises a bolt. In some disclosed examples, the cage sections include a first cage section and a second cage section. In some disclosed examples, the first cage section includes a first sidewall and a first flange extending outwardly from the first sidewall. In some disclosed examples, the first flange has a first transversely-oriented opening. In some disclosed examples, the second cage section includes a second sidewall and a second flange extending outwardly from the second sidewall. In some disclosed examples, the second flange has a second transversely-oriented opening aligned with the first transversely-oriented opening. In some disclosed examples, the bolt is disposed in the first and second transversely-oriented openings. In some disclosed examples, the bolt removably couples the first cage section to the second cage section.

In some disclosed examples of the valve cage, the valve cage further comprises an interlocked tab-and-blank connection. In some disclosed examples, the cage sections include a first cage section and a second cage section. In some disclosed examples, the first cage section includes a tab extending circumferentially away from an end of the first cage section. In some disclosed examples, the second cage section includes a blank recessed circumferentially into an end of the second cage section. In some disclosed examples, the blank axially receives the tab to form the interlocked tab-and-blank connection. In some disclosed examples, the interlocked tab-and-blank connection removably couples the first cage section to the second cage section.

In some disclosed examples of the valve cage, the valve cage further comprises a frictional tongue-and-groove connection. In some disclosed examples, the cage sections include a first cage section and a second cage section. In some disclosed examples, the first cage section includes a tongue extending circumferentially away from an end of the first cage section. In some disclosed examples, the second cage section includes a groove recessed circumferentially into an end of the second cage section. In some disclosed examples, the groove receives the tongue to form the frictional tongue-and-groove connection. In some disclosed examples, the frictional tongue-and-groove connection removably couples the first cage section to the second cage section.

In some examples, a valve is disclosed. In some disclosed examples, the valve comprises a valve body and a valve cage located within the valve body. In some disclosed examples, the valve cage includes a plurality of cage sections removably coupled together to form a circumference of the valve cage. In some disclosed examples, the valve cage further includes a plurality of joints. In some disclosed examples, the joints correspond in number to the cage sections and are spaced apart from one another about the circumference. In some disclosed examples, respective ones of the joints are defined by neighboring ones of the cage sections.

In some disclosed examples of the valve, the valve cage further includes a pin. In some disclosed examples, the cage sections include a first cage section and a second cage section. In some disclosed examples, the first cage section includes a first arm extending circumferentially away from an end of the first cage section. In some disclosed examples, the first arm has a first axially-oriented opening. In some disclosed examples, the second cage section includes a second arm extending circumferentially away from an end of the second cage section. In some disclosed examples, the second arm has a second axially-oriented opening. In some disclosed examples, the second arm is interleaved with the first arm. In some disclosed examples, the second axially-oriented opening is aligned with the first axially-oriented opening. In some disclosed examples, the pin is disposed in the first and second axially-oriented openings. In some disclosed examples, the pin removably couples the first cage section to the second cage section.

In some disclosed examples of the valve, the valve cage further includes a bolt. In some disclosed examples, the cage sections include a first cage section and a second cage section. In some disclosed examples, the first cage section includes a first sidewall and a first flange extending outwardly from the first sidewall. In some disclosed examples, the first flange has a first transversely-oriented opening. In some disclosed examples, the second cage section includes a second sidewall and a second flange extending outwardly from the second sidewall. In some disclosed examples, the second flange has a second transversely-oriented opening aligned with the first transversely-oriented opening. In some disclosed examples, the bolt is disposed in the first and second transversely-oriented openings. In some disclosed examples, the bolt removably couples the first cage section to the second cage section.

In some disclosed examples of the valve, the valve cage further includes an interlocked tab-and-blank connection. In some disclosed examples, the cage sections include a first cage section and a second cage section. In some disclosed examples, the first cage section includes a tab extending circumferentially away from an end of the first cage section. In some disclosed examples, the second cage section includes a blank recessed circumferentially into an end of the second cage section. In some disclosed examples, the blank axially receives the tab to form the interlocked tab-and-blank connection. In some disclosed examples, the interlocked tab-and-blank connection removably couples the first cage section to the second cage section.

In some disclosed examples of the valve, the valve cage further includes a frictional tongue-and-groove connection. In some disclosed examples, the cage sections include a first cage section and a second cage section. In some disclosed examples, the first cage section includes a tongue extending circumferentially away from an end of the first cage section. In some disclosed examples, the second cage section includes a groove recessed circumferentially into an end of the second cage section. In some disclosed examples, the groove receives the tongue to form the frictional tongue-and-groove connection. In some disclosed examples, the frictional tongue-and-groove connection removably couples the first cage section to the second cage section.

Although certain apparatus have been described herein, the scope of coverage of this patent is not limited thereto. On the contrary, this patent covers all apparatus fairly falling within the scope of the appended claims either literally or under the doctrine of equivalents.

What is claimed is:
1. An apparatus, comprising:
  a plurality of cage sections collectively configured to be removably coupled together to form a valve cage having a circumference and a plurality of joints, each cage section of the plurality of cage sections including a plurality of openings extending through a sidewall of the cage section, the plurality of joints corresponding in number to the plurality of cage sections, respective ones of the plurality of joints being spaced apart from one another about the circumference, respective ones of the plurality of joints being defined by neighboring ones of the plurality of cage sections.

2. The apparatus of claim 1, wherein each joint of the plurality of joints extends in an axial direction defined by a central axis of the valve cage.

3. The apparatus of claim 1, wherein respective ones of the plurality of cage sections have corresponding arc lengths, and wherein respective ones of the corresponding arc lengths are equal to one another.

4. The apparatus of claim 1, wherein the plurality of the cage sections includes a first cage section, a second cage section, and a third cage section, the first cage section configured to be removably coupled to the second and third cage sections, the second cage section configured to be removably coupled to the first and third cage sections, the third cage section configured to be removably coupled to the first and second cage sections.

5. The apparatus of claim 1, wherein the plurality of the cage sections includes a first cage section and a second cage section, the first cage section including a first arm extending circumferentially away from an end of the first cage section, the first arm having a first axially-oriented opening, the second cage section including a second arm extending circumferentially away from an end of the second cage section, the second arm having a second axially-oriented opening, the second arm configured to be interleaved with the first arm, the second axially-oriented opening configured to align with the first axially-oriented opening, the aligned first and second axially-oriented openings configured to receive a pin, the pin configured to removably couple the first cage section to the second cage section.

6. The apparatus of claim 1, wherein the plurality of the cage sections includes a first cage section and a second cage section, the first cage section including a first sidewall and a first flange extending outwardly from the first sidewall, the first flange having a first transversely-oriented opening, the second cage section including a second sidewall and a second flange extending outwardly from the second sidewall, the second flange having a second transversely-oriented opening configured to align with the first transversely-oriented opening, the aligned first and second transversely-oriented openings configured to receive a bolt, the bolt configured to removably couple the first cage section to the second cage section.

7. The apparatus of claim 1, wherein the plurality of cage sections includes a first cage section and a second cage section, the first cage section including a tab extending circumferentially away from an end of the first cage section, the second cage section including a blank recessed circumferentially into an end of the second cage section, the blank configured to axially receive the tab to form an interlocked tab-and-blank connection, the interlocked tab-and-blank connection configured to removably couple the first cage section to the second cage section.

8. The apparatus of claim 1, wherein the plurality of the cage sections includes a first cage section and a second cage section, the first cage section including a tongue extending circumferentially away from an end of the first cage section, the second cage section including a groove recessed circumferentially into an end of the second cage section, the groove configured to receive the tongue to form a frictional tongue-and-groove connection, the frictional tongue-and-groove connection configured to removably couple the first cage section to the second cage section.

9. A valve cage, comprising:
a plurality of cage sections removably coupled together to form a circumference of the valve cage, each cage section of the plurality of cage sections including a plurality of openings extending through a sidewall of the cage section; and
a plurality of joints, the plurality of joints corresponding in number to the plurality of cage sections, respective ones of the plurality of joints being spaced apart from one another about the circumference, respective ones of the plurality of joints being defined by neighboring ones of the plurality of cage sections.

10. The valve cage of claim 9, wherein each joint of the plurality of joints extends in an axial direction defined by a central axis of the valve cage.

11. The valve cage of claim 9, wherein respective ones of the plurality of cage sections have corresponding arc lengths, and wherein respective ones of the corresponding arc lengths are equal to one another.

12. The valve cage of claim 9, further comprising a pin, wherein the plurality of the cage sections includes a first cage section and a second cage section, the first cage section including a first arm extending circumferentially away from an end of the first cage section, the first arm having a first axially-oriented opening, the second cage section including a second arm extending circumferentially away from an end of the second cage section, the second arm having a second axially-oriented opening, the second arm interleaved with the first arm, the second axially-oriented opening aligned with the first axially-oriented opening, the pin being disposed in the first and second axially-oriented openings, the pin removably coupling the first cage section to the second cage section.

13. The valve cage of claim 9, further comprising a bolt, wherein the plurality of the cage sections includes a first cage section and a second cage section, the first cage section including a first sidewall and a first flange extending outwardly from the first sidewall, the first flange having a first transversely-oriented opening, the second cage section including a second sidewall and a second flange extending outwardly from the second sidewall, the second flange having a second transversely-oriented opening aligned with the first transversely-oriented opening, the bolt being disposed in the first and second transversely-oriented openings, the bolt removably coupling the first cage section to the second cage section.

14. The valve cage of claim 9, further comprising an interlocked tab-and-blank connection, wherein the plurality of the cage sections includes a first cage section and a second cage section, the first cage section including a tab extending circumferentially away from an end of the first cage section, the second cage section including a blank recessed circumferentially into an end of the second cage section, the blank axially receiving the tab to form the interlocked tab-and-blank connection, the interlocked tab-and-blank connection removably coupling the first cage section to the second cage section.

15. The valve cage of claim 9, further comprising a frictional tongue-and-groove connection, wherein the plurality of the cage sections includes a first cage section and a second cage section, the first cage section including a tongue extending circumferentially away from an end of the first cage section, the second cage section including a groove recessed circumferentially into an end of the second cage section, the groove receiving the tongue to form the frictional tongue-and-groove connection, the frictional tongue-and-groove connection removably coupling the first cage section to the second cage section.

16. A valve, comprising:
a valve body; and a valve cage located within the valve body, the valve cage including:
   a plurality of cage sections removably coupled together to form a circumference of the valve cage, each cage section of the plurality of cage sections including a plurality of openings extending through a sidewall of the cage section; and
   a plurality of joints, the plurality of joints corresponding in number to the plurality of cage sections, respective ones of the plurality of joints being spaced apart from one another about the circumference, respective ones of the plurality of joints being defined by neighboring ones of the plurality of cage sections.

17. The valve of claim 16, wherein the valve cage further includes a pin, and wherein the plurality of the cage sections includes a first cage section and a second cage section, the first cage section including a first arm extending circumferentially away from an end of the first cage section, the first arm having a first axially-oriented opening, the second cage section including a second arm extending circumferentially away from an end of the second cage section, the second arm having a second axially-oriented opening, the second arm interleaved with the first arm, the second axially-oriented opening aligned with the first axially-oriented opening, the pin being disposed in the first and second axially-oriented openings, the pin removably coupling the first cage section to the second cage section.

18. The valve of claim 16, wherein the valve cage further includes a bolt, and wherein the plurality of the cage sections includes a first cage section and a second cage section, the first cage section including a first sidewall and a first flange extending outwardly from the first sidewall, the first flange having a first transversely-oriented opening, the second cage section including a second sidewall and a second flange extending outwardly from the second sidewall, the second flange having a second transversely-oriented opening aligned with the first transversely-oriented opening, the bolt being disposed in the first and second transversely-oriented openings, the bolt removably coupling the first cage section to the second cage section.

19. The valve of claim 16, wherein the valve cage further includes an interlocked tab-and-blank connection, and wherein the plurality of the cage sections includes a first cage section and a second cage section, the first cage section including a tab extending circumferentially away from an end of the first cage section, the second cage section including a blank recessed circumferentially into an end of the second cage section, the blank axially receiving the tab to form the interlocked tab-and-blank connection, the interlocked tab-and-blank connection removably coupling the first cage section to the second cage section.

20. The valve of claim 16, wherein the valve cage further includes a frictional tongue-and-groove connection, and wherein the plurality of the cage sections includes a first cage section and a second cage section, the first cage section including a tongue extending circumferentially away from an end of the first cage section, the second cage section including a groove recessed circumferentially into an end of the second cage section, the groove receiving the tongue to form the frictional tongue-and-groove connection, the frictional tongue-and-groove connection removably coupling the first cage section to the second cage section.

* * * * *